US009175470B2

(12) United States Patent
Yin et al.

(10) Patent No.: US 9,175,470 B2
(45) Date of Patent: Nov. 3, 2015

(54) PREFABRICATED THERMAL INSULATING COMPOSITE PANEL, ASSEMBLY THEREOF, MOULDED PANEL AND CONCRETE SLAB COMPRISING SAME, METHOD AND MOULD PROFILE FOR PREFABRICATING SAME

(75) Inventors: Yiqing Yin, Noenjing (CN); Zhenglin Xu, Nanjing (CN); Zhihong Cal, Shanghai (CN)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 13/989,122

(22) PCT Filed: Nov. 25, 2011

(86) PCT No.: PCT/CN2011/082972
§ 371 (c)(1),
(2), (4) Date: Oct. 1, 2013

(87) PCT Pub. No.: WO2012/069016
PCT Pub. Date: May 31, 2012

(65) Prior Publication Data
US 2014/0059961 A1    Mar. 6, 2014

(30) Foreign Application Priority Data

Nov. 25, 2010    (CN) .......................... 2010 1 0574735

(51) Int. Cl.
*E04B 2/00*    (2006.01)
*E04B 2/86*    (2006.01)
(Continued)

(52) U.S. Cl.
CPC ............ *E04B 2/8647* (2013.01); *B28B 19/003* (2013.01); *B28B 19/0046* (2013.01);
(Continued)

(58) Field of Classification Search
CPC . E04B 1/14; E04B 1/34853; E04B 2001/386; E04B 2001/6195; E04B 1/7608

USPC ............ 52/309.1, 309.3, 309.4, 309.7–309.9, 52/309.11, 309.12, 309.14, 52/309.15–309.17, 479, 483.1, 204.57, 52/204.58, 204.595, 656.1, 656.2, 656.3, 52/656.7, 656.9, 781, 786.11, 786.13, 52/794.1, 801.11; 428/76
See application file for complete search history.

(56) References Cited

U.S. PATENT DOCUMENTS 2,298,989 A    10/1942 Underwood
3,782,054 A *    1/1974 Goss, Jr. ....................... 403/295
(Continued)

FOREIGN PATENT DOCUMENTS

CN    2090320    12/1991
CN    2447083    9/2001
(Continued)

OTHER PUBLICATIONS

Office action from Chinese Application No. 20101057476.6 dated Dec. 9, 2013.
(Continued)

*Primary Examiner* — Patrick Maestri
(74) *Attorney, Agent, or Firm* — Calfee, Halter & Griswold LLP

(57) ABSTRACT

Disclosed are a prefabricated thermal insulating composite panel (1), an assembly thereof, a molded panel and a concrete slab comprising the same, and a method and a mold profile (50) for prefabricating the same. The prefabricated composite thermal insulating panel (1) comprises: two reinforcing protective layers (7) of an inorganic noncombustible material, a core (9) formed by a thermal insulating material, a frame (2) with installation grooves (13) surrounding the core (9) and being secured onto the core (9), with the core (9) being placed between the two reinforcing protective layers (7). The prefabricated thermal insulating composite panel (1) has the inorganic noncombustible material incorporated onto the outside of the core (9) of the thermal insulating material to have it covered, so as to solve the problem of the tendency of causing a fire, during the placement of the thermal insulating panels at a construction site or other places, or during the transportation or installation of the same, due to the combustible material thereof being exposed.

16 Claims, 17 Drawing Sheets

(51) Int. Cl.
*E04F 13/08* (2006.01)
*B32B 3/08* (2006.01)
*B32B 7/04* (2006.01)
*B32B 13/04* (2006.01)
*B28B 19/00* (2006.01)
*B28B 23/00* (2006.01)
*B28B 23/02* (2006.01)
*E04B 1/16* (2006.01)
*E04G 17/065* (2006.01)
*E04B 1/80* (2006.01)
*E04G 9/00* (2006.01)
*E04C 2/00* (2006.01)

(52) U.S. Cl.
CPC ............ *B28B23/0006* (2013.01); *B28B 23/02* (2013.01); *B32B 3/08* (2013.01); *B32B 7/04* (2013.01); *B32B 13/04* (2013.01); *E04B 1/161* (2013.01); *E04B 2/8635* (2013.01); *E04B 2/8652* (2013.01); *E04F 13/0826* (2013.01); *E04F 13/0875* (2013.01); *E04G 17/0658* (2013.01); *E04B 1/80* (2013.01); *E04B 2002/867* (2013.01); *E04C 2/00* (2013.01); *E04G 9/00* (2013.01); *Y10T 428/195* (2015.01); *Y10T 428/239* (2015.01)

(56) References Cited

U.S. PATENT DOCUMENTS

| | | | |
|---|---|---|---|
| 4,050,213 | A | 9/1977 | Dillon |
| 4,905,440 | A | 3/1990 | Schilger |
| 4,987,719 | A | 1/1991 | Goodson, Jr. |
| 4,998,393 | A | 3/1991 | Baena |
| 5,048,257 | A | 9/1991 | Luedtke |
| 7,775,012 | B2 * | 8/2010 | Clark et al. .................. 52/783.1 |
| 8,056,291 | B1 | 11/2011 | diGirolamo et al. |
| 8,484,928 | B2 | 7/2013 | Muller |
| 2003/0233801 | A1 | 12/2003 | Pace |
| 2008/0115442 | A1 * | 5/2008 | Cheng ........................ 52/506.1 |
| 2009/0120026 | A1 | 5/2009 | Wetzel |
| 2011/0011018 | A1 | 1/2011 | Johnson et al. |

FOREIGN PATENT DOCUMENTS

| | | |
|---|---|---|
| CN | 2533177 | 1/2003 |
| CN | 1587560 | 3/2005 |
| CN | 1632251 | 6/2005 |
| CN | 101260723 | 9/2008 |
| CN | 201148667 | 11/2008 |
| CN | 101492936 | 7/2009 |
| CN | 101851986 | 10/2010 |
| CN | 101858114 | 10/2010 |
| CN | 201981699 | 9/2011 |
| CN | 202073197 | 12/2011 |
| DE | 2423582 | 11/1975 |
| JP | 2003-003587 | 1/2003 |

OTHER PUBLICATIONS

Office action from Chinese Application No. 201010574735.7 dated Jun. 21, 2013.
Office action from U.S. Appl. No. 13/989,120 dated Jan. 15, 2015.
International Search Report and Written Opinion from PCT/CN2011/082972 dated Mar. 8, 2012.
Xeuting, Chen et al., "Cold-Formed Thin-Walled Section Steel Structural Member", China Railway Publishing House, Aug. 1990, 5 pgs. (this article was cited in previously submitted Office action from Chinese Application No. 201010574776.6 dated Dec. 9, 2013).

* cited by examiner

PREFABRICATED THERMAL INSULATING COMPOSITE PANEL, ASSEMBLY THEREOF, MOULDED PANEL AND CONCRETE SLAB COMPRISING SAME, METHOD AND MOULD PROFILE FOR PREFABRICATING SAME

FIELD OF THE INVENTION

The present invention belongs to the field of building structural members and fabrication and construction methods thereof, and in particular, relates to a prefabricated thermal insulating composite panel, a prefabricated method and a mould profile for prefabricating the same, and further relates to a permanent concrete form made of said prefabricated thermal insulating composite panel, a splicing module comprising said prefabricated thermal insulating composite panel, a structural member with thermal insulation property formed by combining said prefabricated thermal insulating composite panel with concrete, and a construction method thereof, a structural member with thermal insulation property formed by adding said prefabricated thermal insulating composite panel onto the existing structural substrate, and a construction method thereof.

DESCRIPTION OF THE PRIOR ART

As the global energy supply becomes increasingly tight, various countries are actively developing energy-saving and emission-reducing technologies with immediate effects while vigorously developing new energy technologies. Building energy consumption accounts for more than about 40% of the total social energy consumption, which does not even include energy consumed by building materials in production, transportation and construction processes. Technical development aimed at lowering building-related energy consumption has also become a major direction in the industry.

The most effective and most practical technologies of building energy conservation are external thermal insulation technologies for external wall, which are vigorously promoted and implemented in China right now. Thermal insulation needs to be applied on about 4 billion square meters of newly built buildings every year. In addition, there are about more than 40 billion square meters of existing buildings to be retrofitted for thermal insulation. Related state and local departments have also correspondingly formulated specific implementation standards and operational specifications.

Currently, there is a major difficult problem in the prior art, namely most external thermal insulation applications for external wall employ organic high performance foaming materials, which are combustible materials. If they are hit by open fire, they will be inflamed and it will be difficult to extinguish the fire. Although inorganic thermal insulating materials have excellent fire resistance performance, their thermal insulation property cannot meet the existing energy saving standards and requirements. Current external thermal insulation construction technologies for external wall are mostly layered construction, which makes it inevitable that the organic combustible materials will be exposed in certain periods. When they are hit by open fire (e.g. electric welding and the like), there is still a potential risk of fire.

SUMMARY OF THE INVENTION

One object of the present invention is to provide a novel prefabricated thermal insulating composite panel. Said prefabricated thermal insulating composite panel is prefabricated in a factory by combining an inorganic non-combustible material to the external side of the combustible thermal insulating material, which covers the core of the combustible thermal insulating material, thereby solving the problem of the tendency of causing a fire due to the exposed combustible material while storing, transporting or installing thermal insulation panels at a construction site or other places.

The technologies according to the present invention are as follows:

First Basic Technology

The first basic technology of the present invention relates to a prefabricated thermal insulating composite panel (1), which comprises an internal main surface (101), an external main surface (102), and four side end surfaces (103, 104, 105, 106), includes a core (9) made of the thermal insulation panel, and said prefabricated thermal insulating composite panel further comprises:

Two reinforcing protective layers (7) formed by cement-based or gypsum-based polymer-modified mortar; said core (9) is disposed between said two reinforcing protective layers (7), and said two reinforcing protective layers are bonded with said core (9);

A frame (2), said frame (2) surrounds the periphery of the core (9) and is fastened to the core (9), inside the internal main surface (101) and the external main surface (102) of said prefabricated thermal insulating composite panel, said reinforcing protective layers cover said frame such that said frame is exposed only at the four side end surfaces (103, 104, 105, 106) of said prefabricated thermal insulating composite panel, said frame (2) comprises two frame connection parts (11) at the external side of said frame and disposed at the top and bottom of the frame, respectively, and an installation groove (13) at the external side of said frame and disposed between said two frame connection parts (11), and said installation groove extends along the entire frame length.

The present invention has the following advantageous effects:

According to the prefabricated thermal insulating composite panel of the present invention, the core (9) is disposed between two reinforcing protective layers (7) formed by cement-based or gypsum-based polymer-modified mortar. As a result, on the product of prefabricated thermal insulating composite panel delivered by a manufacturing factory, the inorganic non-combustible reinforcing protective layers (7) have been used to cover the core (9) of the combustible organic material, achieving the effect that it is not easy to be inflamed. This fire-resistant effect is extraordinary either during transportation or at a construction site. In particular for the construction site, it is safer for piling or storage than the thermal insulating panels according to the prior art. Inside the internal main surface (101) and the external main surface (102) of said prefabricated thermal insulating composite panel, moreover, said reinforcing protective layers cover said frame (2). As a result, the frame is used to provide the integrity and strength for the composite panel and the installation groove on the frame is used to make it convenient for assembly. At the same time, said frame is exposed only at the four side end surfaces (103, 104, 105, 106) of said prefabricated thermal insulating composite panel. Consequently, an inorganic non-combustible material covers the combustible organic material to form an enclosed composite structure such that it will not be inflamed.

On the other hand, all of the thermal insulating materials according to the prior art are light and low strength materials, which are much lower than the strength of concrete forms, while the prefabricated thermal insulating composite panel of the present invention has a strength equivalent to that of construction concrete forms thanks to the composite reinforcing protective layers on the external sides. As a result, this composite panel not only has properties of a thermal insulating material, but also can be used as a concrete form that does not need to be detached (i.e. permanent concrete form), thereby integrating thermal insulating material installation and concrete form construction, eliminating the subsequent detachment of concrete forms and extra construction of a thermal insulating layer. It saves working procedures, saves materials, and in particular, saves a large quantity of wood. Therefore, the other object of the present invention is to provide a novel prefabricated thermal insulating composite panel. Said novel prefabricated thermal insulating composite panel adds reinforcing protective layers to both sides of the core of insulating material and adds a frame having an installation groove around the core, which, on one hand, improves the strength of the prefabricated thermal insulating composite panel and on the other hand, enables the assembly of the prefabricated thermal insulating composite panels by means of the installation grooves and embedding strips and/or tension connection parts that coordinate with the installation grooves, ensures the smoothness of external surfaces, realizes the assembly operation on construction sites, and improves the construction efficiency. With respect to this purpose, the material that forms the thermal insulating panel can be either an organic combustible thermal insulating material or an inorganic non-combustible thermal insulating material.

According to the statistics, the construction industry has become the largest user of wood in the industrial sector in China, which accounts for more than 70% of the wood consumption by the industrial sector. For example, the area of buildings under construction by real estate businesses of the whole country reached 3.084 billion square meters in the first half of 2010. If the ratio of construction area to concrete form area is 10:1, the 3.084 billion square meters of building will use 308.4 million square meters of concrete forms. If ⅔ of these concrete forms are wood concrete forms, then about 3.08 million cubic meters of wood (with the average thickness of concrete forms at 15 mm) will be consumed. In other words, we need to cut about 51.3 million trees, equivalent to about 730,000 mu of forest, to manufacture these concrete forms. If the prefabricated thermal insulating composite panel of the present invention is used as a permanent concrete form, the wood can be saved and the forest will escape destruction, and the environment will be protected. According to relevant sources, each hectare of forest can absorb about 16 tons of carbon dioxide and produces 12 tons of oxygen every year. Then, 730,000 mu of forest can absorb 780,000 tons of carbon dioxide and produces 580,000 tons of oxygen every year, which are potential environmental benefits by employing this technology only in the first half of 2010.

Moreover, the prefabricated thermal insulating composite panel of the present invention comprises a periphery surrounding the core (9) and a frame fastened to the core (9), the frame comprises two frame connection parts (11) at the external side of said frame and disposed at the top and bottom of the frame, respectively, and an installation groove (13) at the external side of said frame and disposed between said two frame connection parts (11), and said installation groove extends along the entire frame length. On one hand, the frame helps the provision of integrity for the thermal insulating composite panel and further provides strength. On the other hand, an installation groove is disposed on the frame to extend along its length. With the cooperation between a seamed connector and/or a seamless connector and the installation groove, therefore, the assembly of the prefabricated thermal insulating composite panels is very convenient, which can improve the construction efficiency. For the construction industry, this provides an efficient and rapid novel construction method.

If such a prefabricated composite panel with high structural strength, good thermal insulating property and fire resistant capability is used as permanent concrete form, its size is designed to be modular size, and an industrial frame of cold bend thin wall steel profiles is used as reinforcing bars (i.e. the skeleton of the entire concrete structure), an efficient and rapid integrated novel building system and construction method primarily consisted of composite panel splice, composite panel tension connection and concrete pouring can be developed.

When a cement-based polymer-modified mortar of Portland cement or magnesium oxychloride cement is used as the reinforcing protective layer and an organic thermal insulating material is used as the core, the fire-resistant effect will be more prominent.

The prefabricated thermal insulating composite panel of the present invention can have no decorative surface or have a decorative surface. If a decorative surface (15) is added to the external side of the prefabricated composite panel, the field construction operations can be reduced and the labor intensity may be lowered, which further improves the efficiency, shortens the construction period, and saves the cost.

Furthermore, the prefabricated composite panel of the present invention may be used in combination with the unique structure of the frame of cold bend thin wall steel profiles proposed in the present invention. Such a combination will form the concrete slab structural member of the present invention and the construction method thereof. In said concrete slab structural member, each longitudinal steel profile keel comprises two longitudinal cold bend thin wall steel profiles (951, 952; 851, 852), the main surfaces of said longitudinal cold bend thin wall steel profiles, the main surface of the concrete slab structural member, and the internal side main surface and external side main surface of the prefabricated thermal insulating composite panel or the prefabricated thermal insulating composite panel with a corner included in said thermal insulating composite panel structural assembly are parallel to each other, the two longitudinal cold bend thin wall steel profiles are spaced apart and opposite each other along a direction perpendicular to the main surface of the concrete slab structural member, so that a space (200) is left between the two longitudinal cold bend thin wall steel profiles, and therefore the concrete can easily flow through the space left between the two longitudinal cold bend thin wall steel profiles when it is poured. This avoids the problem created by the placement of the main surfaces of the cold bend thin wall steel profiles perpendicular to the main surface of the concrete slab structural member according to the prior art: 1) when concrete is poured between the external concrete form and the internal concrete form, the flowing of the concrete is hindered by the cold bend thin wall steel profiles, the concrete pouring efficiency is low, and the compactness and homogeneity of the poured concrete are affected; 2) the main surfaces of the cold bend thin wall steel profiles are perpendicular to the main surface of the concrete slab structural member, such that the cold bend thin wall steel profiles extend in the direction from indoor to outdoor and consequently form a cold bridge between the indoor and the outdoor, affecting the thermal insulating effect of the thermal insulating panel. By employing the novel structure of the frame of cold bend thin wall steel profiles, the concrete slab structural member according to the present invention solves the two problems in the prior art: 1) regarding the above problem 1), the longitudinal cold bend thin wall steel profiles of the present invention extend in the direction parallel to the main surface of the concrete slab structural member, and will not cause the same big hindrance as the prior art to the flowing of the poured concrete along the lateral extension direction of the concrete slab and along the concrete forms, and consequently the concrete can smoothly flow in the direction of the main surfaces of thin wall steel profiles. This can improve the pouring efficiency and ensure the compactness and homogeneity of the concrete that has been poured into the space between the internal and external concrete forms; regarding the above problem 2), the cold bend thin wall steel profiles of the present invention extend in the direction parallel to the main surface of the concrete slab structural member (perpendicular to the direction from indoor to outdoor), which avoids the formation of a cold bridge between the indoor and the outdoor.

When the prefabricated thermal insulating composite panel product, the prefabricated thermal insulating composite panel product having a corner and the frame structure product of cold bend thin wall steel profiles according to the present invention are combined, moreover, a complete building industry system will be formed. This system relates to building design and building structure, and moreover, relates to building construction. With an extensive application range, this system has the following advantages:

1. All products in this series are industrialized and standardized products, which can improve the resource utilization efficiency and ensure the product quality through large scale factory production, and turn the time-consuming field construction to factories. This completely complies with the state's development direction of housing industrialization.

2. Since the inorganic non-combustible material is compounded to the external side of the thermal insulating composite panel, the potential fire risk can be effectively eliminated in the transportation, storage and construction processes of these products.

3. When a reinforcing material, such as a reinforcing net formed by alkali-resistant glass fiber, carbon fiber or steel fiber, is added into the reinforcing protective layers of the inorganic non-combustible material on the external side, and/or chopped alkali-resistant glass fiber, chopped alkali-resistant carbon fiber or chopped alkali-resistant steel fiber is evenly distributed in said reinforcing protective layers, the bending strength of the composite panel is significantly superior to the bending strength of veneer plywood used as concrete forms, and can directly take the place of wood concrete forms on the external side of the surface that needs thermal insulation. The use of this form detachment-free technique not only makes the connection between the thermal insulating layer and the structural layer firm, but also eliminates the labor-consuming and time-consuming construction of thermal insulation, and further reduces the operations in conventional construction methods on detachment, maintenance, transport and final treatment of concrete forms.

4. When the prefabricated composite panel according to the present invention is combined with the frame structure of cold bend thin wall steel profiles according to the present invention to replace thread steel with cold bend thin wall steel profiles, the stability of temporary structure and accuracy of sizes are significantly improved without increasing the total steel consumption, such that the construction process is more convenient, rapid and reliable, and the use of temporary support is effectively reduced.

5. Due to the change of the construction method, the workload of field construction is greatly reduced, thereby saving labor, reducing work intensity, and shortening the construction period. As estimated, the application of the novel assembly technique for the building industry formed by the combination of the composite panel according to the present invention and the cold bend thin wall steel profile frame according to the present invention can save labor by 35%~50% and shorten the construction period by more than 40%.

6. When concrete is poured between the permanent concrete form of the present invention and regular concrete form such that the concrete binds with the cold bend thin wall steel profile frame, a composite steel-concrete construction can be formed. The composite steel-concrete construction is one of the structures that are currently recognized to have the most excellent anti-earthquake, lasting and fire-resistant properties. Its anti-earthquake property is far better than the masonry structure, its fire resistant property and lasting property are far better than the steel structure, and its anti-earthquake and structural ductility are far better than those of the reinforced concrete structure according to the prior art.

7. When no concrete is poured, the structure formed by combining the prefabricated composite panel according to the present invention and assembly thereof with the cold bend thin wall steel profile frame according to the prior art can be used to build low lightweight steel buildings or rapidly assembled temporary buildings. In this case, galvanized steel sheets with good weather resistance should be used to make the cold bend thin wall steel profiles and water-proof structure should be constructed.

8. In applications with an existing substrate wall, the composite panel according to the present invention can be used as the product integrated with thermal insulation and decoration. The decorative surface layer can be made into a surface with stone, wood or metal texture. Fine aggregate concrete can be poured into the cavity to improve the structural strength and water-proof capability of the existing wall, which is particularly useful for renovation of old buildings.

Preferred technologies of the first basic technology and other basic technologies of the present invention will be described below, respectively:

Preferred Technologies of the First Basic Technology

In the prefabricated thermal insulating composite panel of a first preferred technology based on the first basic technology, each reinforcing protective layer (7) comprises a reinforcing material embedded therein, and the size of said prefabricated thermal insulating composite panel is a modular size that complies with the building standardization. The prefabricated thermal insulating composite panel of said preferred technology further improves the prefabricated panel strength by embedding a reinforcing material in the reinforcing protective layer, further facilitates the standard production and standard construction of the prefabricated panel and further helps the improvement of construction efficiency by setting the prefabricated panel size to a modular size that complies with the building standardization.

In the prefabricated thermal insulating composite panel of a second preferred technology based on the first preferred technology, said reinforcing material comprises a reinforcing net (8) formed by alkali-resistant glass fiber, carbon fiber or steel fiber, or comprises alkali-resistant chopped glass fiber, chopped carbon fiber or chopped steel fiber that is evenly distributed in said reinforcing protective layers. The reinforcing material according to said preferred technology is particularly effective in further improving the strength of the protective layer and consequently improving the strength of the entire prefabricated panel.

In the prefabricated thermal insulating composite panel of a third preferred technology based on the first preferred technology, said cement is Portland cement or magnesium oxychloride cement, and said thermal insulating panel is made of a combustible organic thermal insulating material. In said preferred technology, Portland cement or magnesium oxychloride cement is combined with the thermal insulating panel made of a combustible organic thermal insulating material such that the fire-resistant effect is further improved.

In the prefabricated thermal insulating composite panel of a fourth preferred technology based on the first basic technology, said frame (2) comprises four frame profile segments, both end surfaces of each frame profile segment are inclined planes such that the ends of the four frame profile segments can be assembled in pairs through butt joint to form a complete frame (2), each frame profile segment is formed integrally, and each frame profile segment comprises:

Two fixing wings (10) at the internal side of said frame profile and disposed at the top and bottom of the frame profile, respectively; and A core fixing groove (3) at the internal side of said frame profile and disposed between said two fixing wings (10);

Wherein, each of said two frame connection parts (11) is formed with a frame connection hole (4); each of the edges of the four sides of said core (9) of said prefabricated thermal insulating composite panel is inserted, respectively, into the core fixing groove (3) of a frame profile segment, and moreover, said two fixing wings (10) of each frame profile segment clamp to be fixed onto one of the four edges of said core (9);

Said prefabricated thermal insulating composite panel further comprises:

A frame profile reinforcing member (5), one or two frame profile reinforcing members (5) are disposed between every two frame profile segments with the ends thereof connected through butt joint, said frame profile reinforcing member (5) comprises two insert connection parts (51), said two insert connection parts (51) are inserted, respectively, into the adjacent frame connection holes (4) of every two adjacent frame profile segments and fixed into the frame connection holes (4) so as to connect the four frame profile segments to form a whole piece.

In said preferred technology, the frame is assembled with segments, the assembly is completed by means of frame reinforcing members and frame connection holes on the frame, and core fixing wings and fixing grooves of the frame are used to fixedly connect with the core. As a result, a novel and unique assembly method is developed that facilitates the manufacturing by building material factories. Furthermore, the manufactured prefabricated composite panel has further improved overall strength and overall rigidity.

In the prefabricated thermal insulating composite panel of a fifth preferred technology based on the fourth preferred technology, said installation groove (13) is disposed in the middle relative to said two frame connection parts (11), and said core fixing groove (3) is disposed in the middle on the internal side of said frame relative to said two fixing wings. In said preferred technology, the installation groove and the core fixing groove are disposed in the middle, respectively, the frame is symmetric laterally, there is no left or right when the frame is installed on the core, which facilitates the operation of installation of the frame on the core at a building material factor; at the same time, the prefabricated thermal insulating composite panel is also symmetric laterally along its central main surface, and there is no need to differentiate the inner or external side of the prefabricated panel when the prefabricated panel is assembled on the construction site, which facilitates the assembly of the prefabricated thermal insulating composite panel on the building construction site.

In the prefabricated thermal insulating composite panel of a sixth preferred technology based on the fifth preferred technology, it further comprises a decorative surface layer (15), said decorative surface layer (15) is disposed at the external side of the reinforcing protective layer (7) at the external side of said prefabricated thermal insulating composite panel and is bonded with said reinforcing protective layer (7). The prefabricated panel in said preferred technology comprises the decorative surface layer such that one assembly operation can complete tasks that can be completed by at least three procedures of the prior art (erecting concrete forms, thermal insulating layer construction and decorative surface layer construction), which further improves the construction efficiency.

In the prefabricated thermal insulating composite panel of a seventh preferred technology based on the first basic technology, said thermal insulating panel is a thermal insulating panel made of a combustible organic thermal insulating material. In said preferred technology, the thermal insulating panel is made of a combustible organic thermal insulating material such that the effects in improving the strength of the prefabricated thermal insulating composite panel and the efficiency of field assembly operation are realized and moreover, the fire resistant effect is further improved. At the same time, the cost of organic thermal insulating material that achieves the same heat resistance is lower than the cost of inorganic thermal insulating material, and the entire prefabricated thermal insulating panel has a greater cost advantage.

In the prefabricated thermal insulating composite panel of an eighth preferred technology based on the first basic technology, said prefabricated thermal insulating panel is square or rectangular, and its size and weight are set to facilitate the manual transport and operation by construction workers. According to said preferred technology, when the prefabricated panel is made into a square or rectangular shape, the assembly operation is more convenient, and it further facilitates the standard design and construction; by setting the size and weight to facilitate the manual transport and operation by construction workers, it can make the construction site less dependent on lifting equipment and reduce the construction cost while improving the construction efficiency. Square prefabricated panels make the assembly thereof more convenient, which means that the four sides of a panel have completely the same structure and there is no need to differentiate during field assembly. When a prefabricated thermal insulating composite panel is formed by combining said eighth preferred technology and the fifth preferred technology, the standardization of panel production and the standardization and convenience of field assembly are further improved. When the prefabricated panels are assembled, there is no need to differentiate internal side from external side, and moreover, there is no need to differentiate vertically and laterally. The assembly is extremely flexible and convenient, which is a construction method that is not easy to result in errors.

The Second Basic Technology and Preferred Technologies Thereof

The second basic technology relates to a prefabricated thermal insulating composite panel with a corner (20), which comprises two thermal insulating composite panel parts, each of said two thermal insulating composite panel parts comprises an internal main surface (101), an external main surface (102), and four side end surfaces, one side end surface of said four side end surfaces is formed to be inclined planes (108, 109) that incline relative to the internal main surface (101) and the external main surface (102) of said thermal insulating composite panel part, the two inclined planes (108, 109) have the same size and same inclination angle for mutual cooperation, the two thermal insulating composite panel parts are connected at the inclined planes through butt joint such that the two thermal insulating composite panel parts are disposed in two different planes, respectively, said two different planes intersect each other, and each thermal insulating composite panel part comprises:

A core (9) made of the thermal insulation panel;

Two reinforcing protective layers (7) formed by cement-based or gypsum-based polymer-modified mortar, said core (9) is disposed between said two reinforcing protective layers (7), and said two reinforcing protective layers are bonded with said core (9);

A frame (2), said frame (2) is disposed on three sides of the three side end surfaces (103, 104, 106) other than the side end surface that is formed to have said inclined planes of said thermal insulating composite panel part of the core (9) and is fastened to the core (9), inside each surface of the internal main surface and the external main surface of said prefabricated thermal insulating composite panel with a corner, said reinforcing protective layers cover said frame such that said frame is exposed only at said three side end surfaces (103, 104, 106) of said prefabricated thermal insulating composite panel part of said prefabricated thermal insulating composite panel with a corner, said frame (2) comprises two frame connection parts (11) at the external side of said frame and disposed at the top and bottom of the frame, respectively, and an installation groove (13) at the external side of said frame and disposed between said two frame connection parts (11), and said installation groove extends along the entire frame length.

In the prefabricated thermal insulating composite panel with a corner of a first preferred technology based on the second basic technology, each reinforcing protective layer (7) comprises a reinforcing material embedded therein, and the size of said prefabricated thermal insulating composite panel with a corner is a modular size that complies with the building standardization.

In the prefabricated thermal insulating composite panel with a corner of a second preferred technology based on the prefabricated thermal insulating composite panel with a corner of the first preferred technology, said reinforcing material comprises a reinforcing net (8) formed by alkali-resistant glass fiber, carbon fiber or steel fiber, or comprises alkali-resistant chopped glass fiber, carbon fiber or steel fiber that is evenly distributed in said reinforcing protective layers.

In the prefabricated thermal insulating composite panel with a corner of a third preferred technology based on the prefabricated thermal insulating composite panel with a corner of the first preferred technology, said cement is Portland cement or magnesium oxychloride cement, and said thermal insulating panel is made of a combustible organic thermal insulating material.

In the prefabricated thermal insulating composite panel with a corner of a fourth preferred technology based on the second basic technology, said frame (2) included in each of said thermal insulating composite panel part comprises three frame profile segments, both end surfaces of each frame profile segment are inclined planes such that the ends of the six frame profile segments can be assembled in pairs through butt joint to form a complete frame (2), each frame profile segment is formed integrally, and each frame profile segment comprises:

Two fixing wings (10) at the internal side of said frame profile and disposed at the top and bottom of the frame profile, respectively; and A core fixing groove (3) at the internal side of said frame profile and disposed between said two fixing wings (10);

Wherein, each of said two frame connection parts (11) is formed with a frame connection hole (4), the edges of three sides of the three side end surfaces (103, 104, 106) other than the side end surface that is formed to have said inclined plane of the core (9) of said thermal insulating composite panel part are inserted, respectively, into the core fixing groove (3) of a frame profile segment, and moreover, said two fixing wings (10) of each frame profile segment clamp to be fixed onto the edge of one side of the above three sides of said core (9);

Said prefabricated thermal insulating composite panel with a corner further comprises:

A frame profile reinforcing member (5). In addition to the position of said inclined planes, one or two frame profile reinforcing members (5) are disposed between every two frame profile segments with the ends thereof connected through butt joint at the butt joint position of side end surfaces of every adjacent two frame profile segments, said frame profile reinforcing member (5) comprises two insert connection parts (51), said two insert connection parts (51) are inserted, respectively, into the adjacent frame connection holes (4) of two adjacent frame profile segments of each thermal insulating composite panel part and fixed into the frame connection holes (4) so as to connect the adjacent frame profile segments to form a whole piece;

Said prefabricated thermal insulating composite panel with a corner further comprises:

A corner frame profile reinforcing member (6), one or two corner frame profile reinforcing members (6) are disposed between two frame profiles at the butt joint of the end surfaces of the two frame profiles at the position of said inclined planes, said corner frame profile reinforcing member (6) comprises a corner insert connection part (61), said corner insert connection part (61) is inserted into the frame connection holes (4) of said two adjacent frames at the position of said inclined planes and fixes the adjacent two frame profiles at the position of said inclined planes where said two thermal insulating composite panel parts are connected through butt joint, thereby fixedly connecting the six frame profile segments of the two adjacent thermal insulating composite panel parts to form a complete frame, and fixedly combining said two thermal insulating composite panel parts to form a whole piece.

In the prefabricated thermal insulating composite panel with a corner of a fifth preferred technology based on the prefabricated thermal insulating composite panel with a corner of the fourth preferred technology, said installation groove (13) is disposed in the middle relative to said two frame connection parts (11), and said core fixing groove (3) is disposed in the middle relative to said two fixing wings (10).

In the prefabricated thermal insulating composite panel with a corner of a sixth preferred technology based on the second basic technology, it further comprises a decorative surface layer (15), said decorative surface layer (15) is disposed at the external side of the reinforcing protective layer (7) at the external side of said prefabricated thermal insulating composite panel with a corner and is bonded with said reinforcing protective layer (7).

In the prefabricated thermal insulating composite panel with a corner of a seventh preferred technology based on the second basic technology, said thermal insulating panel is a thermal insulating panel made of a combustible organic thermal insulating material.

In the prefabricated thermal insulating composite panel with a corner of an eighth preferred technology based on the prefabricated thermal insulating composite panel with a corner of the seventh preferred technology, the thermal insulating composite panel parts of said prefabricated thermal insulating panel having a corner are square or rectangular, and their size and weight are set to facilitate the manual transport and operation by construction workers.

The further advantageous effects of the first basic technology of the present invention and preferred technologies thereof that have been described above are similarly applicable to the substrate technology and preferred technologies thereof of the prefabricated thermal insulating composite panel with a corner of the present invention, which will not be described again herein.

The Third Basic Technology and Preferred Technologies Thereof

The third basic technology of the present invention relates to a thermal insulating composite panel structure assembly, which comprises a plurality of prefabricated thermal insulating composite panels (1) as set forth in any technology of the first basic technology and preferred technologies thereof, said plurality of prefabricated thermal insulating composite panels are assembled by means of butt joint of side end surfaces, the structure assembly consisted of said prefabricated thermal insulating composite panels further comprises: a plurality of tension connection members, each of said plurality of tension connection members comprises installation groove embedding parts (162, 163, 171, 172) and projecting parts (164, 173), said installation groove embedding parts are embedded into the installation grooves of said prefabricated thermal insulating composite panels, said projecting parts project out of said installation grooves and extend toward said internal main surface (101) and beyond said internal main surface (101), and through the connection cooperation between said plurality of tension connection members and said installation grooves, said plurality of prefabricated thermal insulating composite panels are assembled together.

The thermal insulating composite panel structure assembly of a first preferred technology based on the third basic technology further comprises a plurality of prefabricated thermal insulating composite panels with a corner (20) as set forth in any technology of the second basic technology and preferred technologies thereof, the height and thickness of said plurality of prefabricated thermal insulating composite panels with a corner are equal to the height and thickness of said prefabricated thermal insulating composite panels, respectively, the installation grooves of said prefabricated thermal insulating composite panels with a corner have the same size as the installation grooves (13) of said prefabricated thermal insulating composite panels, side end surfaces of said prefabricated thermal insulating composite panel with a corner are connected with side end surfaces of said prefabricated thermal insulating composite panels in pairs through butt joint. Through the connection cooperation between a plurality of tension connection members (16, 17) and said installation groove (13), said prefabricated thermal insulating composite panels with a corner and said prefabricated thermal insulating composite panels that are adjacent and connected through butt joint are assembled together, and every two adjacent prefabricated thermal insulating composite panels with a corner are assembled together through the connection cooperation between the tension connection members and said installation groove.

In the thermal insulating composite panel structure assembly of a second preferred technology based on the third basic technology or the first preferred technology of the third basic technology, said tension connection members substantially appear to be of a T shape, said installation groove embedding part is formed at the top portion of said T shape, said projecting part is formed at the bottom portion of said T shape, the cross-sectional shape of the installation groove embedding part (162, 163, 171, 172) of said tension connection member is consistent with the cross-sectional shape of said installation groove (13) such that the installation groove embedding part (162, 163, 171, 172) and said installation groove (13) cooperate mutually.

In the thermal insulating composite panel structure assembly of a third preferred technology based on the third basic technology, said tension connection member comprises a seamed tension connection member (16) and a seamless tension connection member (17), said seamed tension connection member comprises a body (161), the projecting part (164) of said seamed tension connection member is located in the same plane as said body (161) of said seamed tension connection member, the installation groove embedding parts (162, 163) of said seamed tension connection member extend beyond the surface in which said projecting part and said body of said seamed tension connection member are located along a direction perpendicular to the surface in which said projecting part and said body of said seamed tension connection member are located, in said structure assembly, said seamed tension connection member is disposed inside a horizontal seam formed by the butt joint of every two adjacent prefabricated thermal insulating composite panels, the cross-sectional widths ($W_{1a1}$, $W_{1a2}$) of the installation groove embedding parts of said seamed tension connection member and said seamless tension connection member are equal to the width ($W_{groove}$) of the installation groove of the prefabricated thermal insulating composite panel, and the cross-sectional height ($h_{1a1}$) of the installation groove embedding part of said seamed tension connection member is equal to or smaller than the depth ($d_{groove}$) of the installation groove; the cross-sectional height ($h_{1a2}$) of the installation groove embedding part of said seamless tension connection member is equal to the sum of the depths ($d_{groove}$) of two installation grooves of two prefabricated thermal insulating composite panels that are connected through butt joint, said seamless tension connection member comprises a necking part (178), said necking part is disposed between said installation groove embedding part (171) and said projecting part (173), said entire seamless tension connection member has the same thickness, the cross-sectional width of said necking part is smaller than the cross-sectional width of said projecting part, a slot (179) is formed along one of the two vertical frame connection parts (11) of each of every two prefabricated thermal insulating composite panels that are adjacent laterally, two adjacent slots are opposite each other, the width of said slot is equal to the width of said necking part, and the sum of the depths of two slots is equal to the thickness of said necking part.

In the thermal insulating composite panel structure assembly based on the first preferred technology of the third basic technology, said tension connection member comprises a seamed tension connection member (16) and a seamless tension connection member (17), said seamed tension connection member comprises a body (161), the projecting part (164) of said seamed tension connection member is located in the same plane as said body (161) of said seamed tension connection member, the installation groove embedding parts (162, 163) of said seamed tension connection member extend beyond the surface in which said projecting part and said body of said seamed tension connection member are located along a direction perpendicular to the surface in which said projecting part and said body of said seamed tension connection member are located, in said structure assembly, said seamed tension connection member is disposed inside both a horizontal seam formed by the butt joint of every two adjacent prefabricated thermal insulating composite panels and a horizontal seam formed by the butt joint of every two adjacent prefabricated thermal insulating composite panels with a corner, the cross-sectional widths ($W_{1a1}$, $W_{1a2}$) of the installation groove embedding parts of said seamed tension connection member and said seamless tension connection member are equal to the width ($W_{groove}$) of the installation groove of the prefabricated thermal insulating composite panel and of the installation groove of the prefabricated thermal insulating composite panel with a corner, and the cross-sectional height ($h_{1a1}$) of the installation groove embedding part of said seamed tension connection member is equal to or smaller than the depth ($d_{groove}$) of said installation grooves; the cross-sectional height ($h_{1a2}$) of the installation groove embedding part of said seamless tension connection member is equal to the sum of the depths ($d_{groove}$) of two installation grooves, said seamless tension connection member comprises a necking part (178), said necking part is disposed between said installation groove embedding part (171) and said projecting part (173), said entire seamless tension connection member has the same thickness, the cross-sectional width of said necking part is smaller than the cross-sectional width of said projecting part, a slot (179) is formed along one of the two vertical frame connection parts (11) of each of every two prefabricated thermal insulating composite panels that are adjacent laterally and vertically along one of the two frame connection parts (11) of each of a prefabricated thermal insulating composite panel and a prefabricated thermal insulating composite panel with a corner that are adjacent laterally, two adjacent slots are opposite each other, the width of said slot is equal to the width of said necking part, and the sum of the depths of two slots is equal to the thickness of said necking part.

The Fourth Basic Technology

The fourth basic technology of the present invention relates to a permanent concrete form, said permanent concrete form comprising:

The prefabricated thermal insulating composite panel as set forth in any technology of the first basic technology and preferred technologies thereof, and/or the prefabricated thermal insulating composite panel with a corner as set forth in any technology of the second basic technology and preferred technologies thereof;

Or comprising: the thermal insulating composite panel structure assembly as set forth in any technology of the third basic technology and preferred technologies thereof.

The Fifth Basic Technology and Preferred Technologies Thereof

The fifth basic technology of the present invention relates to a concrete slab structural member, comprising:

A reinforcing bar;

A first concrete form, which is disposed at one side of said reinforcing bar;

A second concrete form, which is disposed at the other side of said reinforcing bar;

Concrete, which is disposed between said first concrete form and said second concrete form;

Wherein one or both of said first concrete form and said second concrete form are permanent concrete forms, and said concrete binds with said reinforcing bar and said permanent concrete forms to form a whole piece;

Wherein said permanent concrete form comprises: the thermal insulating composite panel structure assembly as set forth in any technology of the third basic technology and preferred technologies thereof, and said thermal insulating composite panel structure assembly is fixedly connected with said reinforcing bar via the projecting part of said tension connection member (16, 17, 165).

In the concrete slab structural member of a first preferred technology based on the fifth basic technology, said reinforcing bar is a steel bar or a cold bend thin wall steel profile frame; said cold bend thin wall steel profile frame comprises:

a plurality of longitudinal steel profile keels (95, 85) that are spaced apart along the extension direction of the main surface of the concrete slab structural member and placed in parallel to one another, each of the longitudinal steel profile keels comprises two longitudinal cold bend thin wall steel profiles (951, 952; 851, 852), the main surfaces of said longitudinal cold bend thin wall steel profiles are parallel to the internal main surface and the external main surface of the prefabricated thermal insulating composite panel or the prefabricated thermal insulating composite panel with a corner included in said thermal insulating composite panel structure assembly, said two longitudinal cold bend thin wall steel profiles are spaced apart and opposite each other along a direction perpendicular to the main surface of the concrete slab structural member, such that a space (200) is left between the two longitudinal cold bend thin wall steel profiles, and consequently the concrete can easily flow through the space left between the two longitudinal cold bend thin wall steel profiles when it is poured, the space left between the two longitudinal cold bend thin wall steel profiles is filled up with concrete, and both said first concrete form and said second concrete form are fixedly connected with said cold bend thin wall steel profile frame.

In the concrete slab structural member of a second preferred technology based on the first preferred technology of the fifth basic technology, said two longitudinal cold bend thin wall steel profiles are fixedly connected through steel profile connection members (96, 87), both said first concrete form and said second concrete form are spaced apart from the longitudinal cold bend thin wall steel profiles, and the concrete between said first concrete form and said second concrete form covers said cold bend thin wall steel profile frame.

In the concrete slab structural member of a third preferred technology based on the first preferred technology of the fifth basic technology, the longitudinal cold bend thin wall steel profiles (951, 952) included in each longitudinal cold bend thin wall steel profile keel (95) have a plurality of keel through holes (953, 954) distributed along the lengthwise direction thereon, the keel through holes (953, 954) on the two longitudinal cold bend thin wall steel profiles are opposite each other, projecting parts of said tension connection members (16, 17, 165) run through at least some of the keel through holes (953, 954) such that the running through direction of said keel through holes is perpendicular to the main surfaces of said concrete slab structural member and the internal main surface and the external main surface of the prefabricated thermal insulating composite panel or the prefabricated thermal insulating composite panel with a corner included in said thermal insulating composite panel structure assembly; one of said first concrete form and said second concrete form is regular concrete form, said permanent concrete form is the external concrete form, and said regular concrete form is the internal concrete form (92), Said concrete slab structural member further comprises a tension bolt (91) and a tension sleeve (90), said tension sleeve (90) is disposed between said internal concrete form (92) and the longitudinal cold bend thin wall steel profile of the two longitudinal cold bend thin wall steel profiles included in each longitudinal steel profile keel that is located at the internal side;

The projecting parts of said tension connection members (16, 17, 165) extend out of said external concrete form and run through said keel through holes to connect with said tension sleeve for fixedly connecting said external concrete form with said longitudinal steel profile keel, and said tension bolt (91)

runs through said internal concrete form (92) to connect with said tension sleeve for fixedly connecting said internal concrete form with said longitudinal steel profile keel.

In the concrete slab structural member of a fourth preferred technology based on the third preferred technology of the fifth basic technology, said concrete slab structural member further comprises:

A limiting sleeve (80), which is disposed between said external concrete form and the longitudinal cold bend thin wall steel profile of the two longitudinal cold bend thin wall steel profiles included in each longitudinal steel profile keel that is located at the external side.

In the concrete slab structural member of a fifth preferred technology based on the second preferred technology of the fifth basic technology, both of the two longitudinal cold bend thin wall steel profiles included in each longitudinal steel profile keel are C shaped steel profiles, and said cold bend thin wall steel profile frame further comprises:

A lateral connection steel profile keel, which comprises lateral cold bend thin wall steel profiles (981, 982, 881, 882);

A diagonal connection steel profile keel, which comprises diagonal cold bend thin wall steel profiles (891, 892), said longitudinal steel profile keels are placed vertically, a plurality of longitudinal steel profile keels placed in parallel are connected via said lateral connection steel profile keel, said diagonal connection steel profile keel is connected with said longitudinal steel profile keels, and said longitudinal steel profile keels, said lateral connection steel profile keel and said diagonal connection steel profile keel are connected to form a stable overall rigid structure.

In the concrete slab structural member of a sixth preferred technology based on the third preferred technology of the fifth basic technology, there is threaded connection between said tension connection member (165) and said tension sleeve (90), and there is threaded connection between said tension bolt (91) and said tension sleeve (90).

In the concrete slab structural member of a seventh preferred technology based on the fifth basic technology, the concrete slab structural member is a concrete wall slab structural member, further comprising: a starting platform (30) disposed at the bottom, said starting platform is fixed with a starting strip (31) thereon, said starting strip (31) has a projecting embedding part (310) that projects upwardly, the lowest installation groove (13) on the lowest prefabricated thermal insulating composite panel and prefabricated thermal insulating composite panel with a corner included in said permanent concrete form cooperates with the projecting embedding part (310) of said starting strip, and the projecting embedding part is embedded into said lowest installation groove.

The Sixth Basic Technology and Preferred Technologies Thereof

The sixth basic technology relates to a concrete wall slab structural member, comprising: a reinforcing bar; a first concrete form, which is disposed at one side of said reinforcing bar; a second concrete form, which is disposed at the other side of said reinforcing bar; a concrete form support, and said first concrete form and said second concrete form are fixedly connected with said concrete form support; concrete, which is disposed between said first concrete form and said second concrete form; wherein one or both of said first concrete form and said second concrete form are permanent concrete forms, and said concrete binds with said reinforcing bar and said permanent concrete forms to form a whole piece; wherein said permanent concrete form comprises the thermal insulating composite panel structure assembly as set forth in any technology of the third basic technology and preferred technologies thereof, and said thermal insulating composite panel structure assembly is fixedly connected with said concrete form support via the projecting part of said tension connection member (16, 17, 165).

In the concrete wall slab structural member of a first preferred technology based on the sixth basic technology, said first concrete form is the external concrete form, said external concrete form is permanent concrete form, said second concrete form is the internal concrete form (92), the concrete form support of said concrete wall slab structural member comprises: a concrete form vertical keel (922) and a concrete form lateral keel (921);

Said concrete wall slab structural member further comprises a tension bolt (91) and a tension sleeve (90), said tension sleeve (90) is disposed at the external side of said internal concrete form (92) and adjacent to said internal concrete form, said concrete form vertical keel (922) is disposed at the internal side of said internal concrete form (92) and adjacent to said internal concrete form, and said concrete form lateral keel is disposed at the internal side of said concrete form vertical keel and adjacent to said concrete form lateral keel. Starting from the internal side of said concrete form lateral keel, said tension bolt (91) runs through said concrete form lateral keel (921), said concrete form vertical keel (922) and said internal concrete form (92) sequentially to connect with said tension sleeve (90), thereby fixedly connecting said internal concrete form, said concrete form lateral keel and said concrete form vertical keel; the projecting part of said tension connection member (165) extends out of said external concrete form and runs through to connect with said tension sleeve, thereby fixedly connecting said external concrete form with said internal concrete form, said concrete form vertical keel and said concrete form lateral keel.

In the concrete wall slab structural member of a second preferred technology based on the first preferred technology of the sixth basic technology, there is threaded connection between said tension connection member (165) and said tension sleeve (90), and there is threaded connection between said tension bolt (91) and said tension sleeve (90).

In the concrete wall slab structural member of a third preferred technology based on the sixth basic technology, it further comprises: a starting platform (30) disposed at the bottom, said starting platform is fixed with a starting strip (31) thereon, said starting strip (31) has a projecting embedding part (310) that projects upwardly, the lowest installation groove (13) on the lowest prefabricated thermal insulating composite panel and prefabricated thermal insulating composite panel with a corner included in said permanent concrete form cooperates with the projecting embedding part (310) of said starting strip, and the projecting embedding part is embedded into said lowest installation groove.

The Seventh Basic Technology and Preferred Technologies Thereof

The seventh basic technology of the present invention relates to a wall structural member, comprising: a wall main structure part (100) and a thermal insulating layer part, said thermal insulating layer part being fixedly connected with said wall main structure part (100), characterized in that: said thermal insulating layer part is the thermal insulating composite panel structure assembly as set forth in any one of claims 19-23, and the projecting part of said tension connection member (16, 165) is fixedly connected with said wall main structure part (100) so as to fixedly connect said thermal insulating composite panel structure assembly to said wall main structure part.

In the wall structural member of a first preferred technology based on the seventh basic technology, the projecting part of said tension connection member (16) is formed with a fastening hole, said wall main structure part is fixed with a support member (202), and said tension connection member is fixedly connected to said support member (202) through the fastening hole on said projecting part and a fastening member.

In the wall structural member of a second preferred technology based on the seventh basic technology, it further comprises: a starting platform (30) disposed at the bottom, said starting platform is fixed with a starting strip (31) thereon, said starting strip (31) has a projecting embedding part (310) that projects upwardly, the lowest installation groove (13) on the lowest prefabricated thermal insulating composite panel and prefabricated thermal insulating composite panel with a corner included in said permanent concrete form cooperates with the projecting embedding part (310) of said starting strip, and the projecting embedding part is embedded into said lowest installation groove.

The Eighth Basic Technology and Preferred Technologies Thereof

The eighth basic technology of the present invention relates to a mould profile (50) for fabricating the prefabricated thermal insulating composite panel as set forth in the first basic technology and preferred technologies thereof or the prefabricated thermal insulating composite panel with a corner as set forth in the second basic technology and preferred technologies thereof, which comprises: a profile body (501), said profile body comprises internal abutting parts (507) for the two frame connection parts (11) of the frame (2) of said prefabricated thermal insulating composite panel or said prefabricated thermal insulating composite panel with a corner to abut against during fabrication of said prefabricated thermal insulating composite panel or said prefabricated thermal insulating composite panel with a corner, a limiting projecting part (504) projects out from the surface of said internal abutting part for being inserted into the installation groove (13) during fabrication of said prefabricated thermal insulating composite panel or said prefabricated thermal insulating composite panel with a corner so as to limit the core (9), the thickness of said limiting projecting part is equal to the width ($W_{groove}$) of said installation groove, a top alignment projecting part (503) is disposed on said internal abutting part for determining the thickness of the reinforcing protective layer (7) during fabrication of said prefabricated thermal insulating composite panel or said prefabricated thermal insulating composite panel with a corner, and the distance from the top surface of said limiting projecting part (504) to the top surface of said top alignment projecting part (503) is greater than the thickness of said frame connection parts (11).

In the mould profile of a first preferred technology based on the eighth basic technology, it further comprises a bottom alignment projecting part (502) for determining the thickness of a reinforcing protective layer (7) during fabrication of said prefabricated thermal insulating composite panel or said prefabricated thermal insulating composite panel with a corner, the distance from the bottom surface of said limiting projecting part (504) to the bottom surface of said bottom alignment projecting part (502) is greater than the thickness of said frame connection parts (11), and the distance of said top alignment projecting part (503) projecting upwardly from the top surface of said limiting projecting part (504) is equal to the distance of said bottom alignment projecting part (502) projecting downwardly from the bottom surface of said limiting projecting part (504).

In the mould profile of a second preferred technology based on the first preferred technology of the eighth basic technology, said top alignment projecting part projects to above the top surface of said profile body (501), and said bottom alignment projecting part (502) projects to below the bottom surface of said profile body.

In the mould profile of a third preferred technology based on the eighth basic technology, said profile body is a hollow profile body and said mould profile is formed by an aluminum alloy profile.

The Ninth Basic Technology and Preferred Technologies Thereof

The ninth basic technology relates to a construction method for a cast-in-place concrete wall, which comprises the following steps:

A step of installing a cold bend thin wall steel profile frame;

A step of installing an external concrete form, wherein the external concrete form is installed to be fixedly connected with the cold bend thin wall steel profile frame, the permanent concrete form of the thermal insulating composite panel structure assembly as set forth in the third basic technology and preferred technologies thereof is used as the external concrete form, the tension connection member (16, 17, 165) is inserted into the installation grooves (13) on the side edges of two adjacent prefabricated thermal insulating composite panels or two adjacent prefabricated thermal insulating composite panels with a corner or adjacent prefabricated thermal insulating composite panel and prefabricated thermal insulating composite panel with a corner, and the fixed connection between the external concrete form and the cold bend thin wall steel profile frame is achieved through the fixed connection between the projecting part of the tension connection member (16, 17, 165) and the cold bend thin wall steel profile frame;

A step of installing an internal concrete form, wherein the internal concrete form is installed to be fixedly connected with the cold bend thin wall steel profile frame.

In the construction method for a cast-in-place concrete wall of a first preferred technology based on the ninth basic technology, the surface size of the main surface of the prefabricated thermal insulating composite panel or the prefabricated thermal insulating composite panel with a corner included in said external concrete form is a modular size, and the step of installing the external concrete form is repeated so as to reach a floor height by assembling multiple layers of the external concrete form with a modular size.

In the construction method for a cast-in-place concrete wall of a second preferred technology based on the first preferred technology of the ninth basic technology, the surface size of the main surface of said internal concrete form is the same as the surface size of the main surface of said external concrete form, the step of installing the internal concrete form is repeated so as to reach a floor height by assembling multiple layers of the internal concrete form with a modular size, and the assembly of the external concrete form with a modular size and the assembly of the internal concrete form with a modular size opposing the external concrete form are carried out alternately.

In the construction method for a cast-in-place concrete wall of a third preferred technology based on the ninth basic technology, when installing the external concrete form and internal concrete form at the very bottom layer, it comprises a step of installing a starting strip on the starting platform (30), wherein the starting strip (31) is fixed on the starting platform (30), the starting strip has a projecting embedding part (310), the lowest installation groove (13) on the lowest prefabricated thermal insulating composite panel or prefabricated thermal insulating composite panel with a corner included in said permanent concrete form cooperates with the projecting embedding part (310) of said starting strip, such that the projecting embedding part is embedded into said lowest installation groove.

In the construction method for a cast-in-place concrete wall of a fourth preferred technology based on the ninth basic technology, the step of installing a cold bend thin wall steel profile frame comprises: installing a plurality of longitudinal steel profile keels (95, 85) that are spaced apart along the extension direction of the main surface of the concrete wall and placed in parallel to one another, each of the longitudinal steel profile keels comprises two longitudinal cold bend thin wall steel profiles (951, 952; 851, 852), the main surfaces of said longitudinal cold bend thin wall steel profiles are set to be parallel to the main surface of said concrete wall and the internal main surface and the external main surface of the prefabricated thermal insulating composite panel or the prefabricated thermal insulating composite panel with a corner included in said thermal insulating composite panel structure assembly, such that said two longitudinal cold bend thin wall steel profiles are spaced apart and opposite each other along a direction perpendicular to the main surface of said concrete wall, and consequently a space (200) is left between the two longitudinal cold bend thin wall steel profiles, so that the concrete can easily flow through the space left between the two longitudinal cold bend thin wall steel profiles when it is poured.

In the construction method for a cast-in-place concrete wall of a fifth preferred technology based on the fourth preferred technology of the ninth basic technology, in the steps of installing the external concrete form and internal concrete form, it comprises: inserting a vertical embedding strip (177) and the tension connection member (16, 17, 165) into the vertical installation grooves (13) on the side edges of laterally adjacent prefabricated thermal insulating composite panels, and inserting a lateral embedding strip (166) and the tension connection member (16, 17, 165) into the horizontal installation grooves (13) on the side edges of vertically adjacent prefabricated thermal insulating composite panels, wherein the fixed connection between the external concrete form and the cold bend thin wall steel profile frame is achieved by running the projecting part of the tension connection member (16, 17, 165) through the keel through holes (953, 954) on the longitudinal cold bend thin wall steel profile keel (95) included in the steel profile frame to connect with the tension sleeve (90) disposed at the internal side of the vertical keel through threads so as to fixedly connect the prefabricated thermal insulating composite panel or the prefabricated thermal insulating composite panel with a corner with the cold bend thin wall steel profile frame, and running a tension bolt (91) having a gasket from the internal side of the internal concrete form (92) through the keel through holes between the adjacent internal concrete forms to connect with the tension sleeve (90) through threads so as to fixedly connect all internal concrete forms with the cold bend thin wall steel profile frame.

In the construction method for a cast-in-place concrete wall of a sixth preferred technology based on the ninth basic technology, when assembling the permanent external concrete form with the internal concrete form to fixedly connect the same with the cold bend thin wall steel profile frame, the limiting sleeve (80), the tension connection member (16, 17, 165) and the tension bolt (91) are used to form a reliable cavity with equal width.

The Tenth Basic Technology and Preferred Technologies Thereof

The tenth basic technology relates to a construction method for a cast-in-place concrete thermal insulating wall, which comprises the following steps:

Installing a concrete form support structure;

A step of installing an internal concrete form (92), wherein the internal concrete form (92) is fixedly connected with said concrete form support structure;

A step of installing an external concrete form, wherein the permanent concrete form of the thermal insulating composite panel structure assembly as set forth in one of the third basic technology and preferred technologies thereof is used as the external concrete form, the tension connection member (16, 17, 165) is inserted into the installation grooves (13) on the side edges of two adjacent prefabricated thermal insulating composite panels or two adjacent prefabricated thermal insulating composite panels with a corner or adjacent prefabricated thermal insulating composite panel and prefabricated thermal insulating composite panel with a corner to connect the projecting part of the tension connection member (16, 17, 165) to said concrete form support structure, thereby fixedly connecting the external concrete form with the concrete form support structure.

In the construction method for a cast-in-place concrete wall of a first preferred technology based on the tenth basic technology, when installing the external concrete form at the very bottom layer, it comprises a step of installing a starting strip (31) on the starting platform (30), wherein the starting strip (31) is fixed on the starting platform (30), the starting strip has a projecting embedding part (310), the lowest installation groove (13) on the lowest prefabricated thermal insulating composite panel or prefabricated thermal insulating composite panel with a corner included in said permanent concrete form is made to cooperate with the projecting embedding part (310) of said starting strip, such that the projecting embedding part is embedded into said lowest installation groove.

In the construction method for a cast-in-place concrete wall of a second preferred technology based on the tenth basic technology, in the step of installing an internal concrete form (92), the fixed connection between the internal concrete form (92) and said concrete form support structure is achieved by running a tension bolt (91) through the concrete form support structure from the external side to be fixedly connected with the tension sleeve (90) disposed at the internal side of the concrete form support structure, and in the step of installing an external concrete form, the end of the projecting part of the tension connection member (165) is connected with the tension sleeve (90).

In the construction method for a cast-in-place concrete wall of a third preferred technology based on the second preferred technology of the tenth basic technology, there is threaded connection between said tension connection member (165) and said tension sleeve (90), there is threaded connection between said tension bolt (91) and said tension sleeve (90), the connection point between said tension connection member (165) and said tension sleeve (90) is at the external portion of said tension sleeve (90), and the connection point between said tension bolt (91) and said tension sleeve (90) is at the external portion of said tension sleeve (90).

The Eleventh Basic Technology and Preferred Technologies Thereof

The eleventh basic technology relates to a construction method for a concrete wall, which comprises the following steps: a step of installing a thermal insulating layer part at the external side of the wall main structure part (100), wherein said thermal insulating layer part is fixedly connected with said wall main structure part (100), characterized in that said thermal insulating layer part is the thermal insulating composite panel structure assembly as set forth in one of the third basic technology and preferred technologies thereof. In the step of installing a thermal insulating layer part, the projecting part of the tension connection member (16, 165) included in said thermal insulating composite panel structure assembly is fixedly connected with said wall main structure part (100) so as to fixedly connect said thermal insulating composite panel structure assembly to said wall main structure part.

In the construction method for a concrete wall of a first preferred technology based on the eleventh basic technology, said tension connection member (16) is a tension connection member (16) having a fastening hole on the projecting part. In the step of installing a thermal insulating layer part, a support member (202) is first fixed to the external side of said wall main structure part, then said tension connection member (16) is fixedly connected to said support member (202) through the fastening hole on said projecting part of said tension connection member and a fastening member (203), thereby connecting the prefabricated thermal insulating composite panel (1) or the prefabricated thermal insulating composite panel with a corner (20) included in the thermal insulating composite panel structure assembly to the wall main structure part (100).

In the construction method for a concrete wall of a second preferred technology based on the eleventh basic technology, the step of installing a thermal insulating layer part further comprises: fixing a starting strip (31) on the starting platform (30) at the bottom, the starting strip (31) having a projecting embedding part (310) that projects upwardly, and making the lowest installation groove (13) on the lowest prefabricated thermal insulating composite panel and prefabricated thermal insulating composite panel with a corner included in said thermal insulating composite panel structure assembly to cooperate with the projecting embedding part (310) of said starting strip so as to embed the projecting embedding part into said lowest installation groove.

In the construction method for a concrete wall of a third preferred technology based on the eleventh basic technology, in the step of installing a thermal insulating layer part, a space is left for pouring concrete between said thermal insulating layer part and said wall main structure part (100). When the thermal insulating layer part has been installed, a dense fine aggregate concrete is poured into said space so as to improve the structural strength and water proof capability of the existing wall substrate.

In the construction method for a concrete wall of a fourth preferred technology based on the first preferred technology of the eleventh basic technology, when the support member (202) is fixed to the wall main structure part (100), an expansion bolt (201) is used to fix the support member laterally or vertically to the wall main structure part (100).

The Twelfth Basic Technology and Preferred Technologies Thereof

The twelfth basic technology relates to a prefabrication method for fabricating the prefabricated thermal insulating composite panel as set forth in one of the first basic technology and preferred technologies thereof or the prefabricated thermal insulating composite panel with a corner as set forth in one of the second basic technology and preferred technologies thereof, characterized in that: the mould profile (50) as set forth in one of the eighth basic technology and preferred technologies thereof is used, comprising the following steps:

1) Using the frame assembled by said mould profile (50) as the mould;
2) Placing the core (9) having the frame (2) into the mould such that the installation groove (13) of the frame (2) closely combines with the limiting projecting part (504) at the internal side of said mould profile (50) to limit the core (9);
3) Applying a reinforcing protective layer (7) formed by cement-based or gypsum-based polymer-modified mortar on one side of the core (9), when coating the reinforcing protective layer (7) formed by cement-based or gypsum-based polymer-modified mortar, use high points of the alignment projecting parts (503, 502) on the cross section of said mould profile (50) as the control points for the thickness of the reinforcing protective layer (7) of the composite panel so as to ensure the uniform thickness and size of the composite panel;
4) Turning over the mould, and repeating Step 3 for applying a reinforcing protective layer (7) formed by cement-based or gypsum-based polymer-modified mortar on the other side of the core (9);
5) Detaching the form after the initial setting of the reinforcing protective layers (7) to remove said mould profile (50);
6) Maintaining the thermal insulating composite panel or the prefabricated thermal insulating composite panel with a corner.

In the prefabrication method of a first preferred technology based on the twelfth basic technology, when applying a reinforcing protective layer (7) formed by cement-based or gypsum-based polymer-modified mortar on one side of the core (9), said reinforcing protective layer (7) is applied in two equal layers (71), wherein the first layer of the reinforcing protective layer (71) formed by cement-based or gypsum-based polymer-modified mortar is first applied on the core (9), coating a reinforcing material (8), and then the second layer of the reinforcing protective layer (71) formed by cement-based or gypsum-based polymer-modified mortar is further coated. When the second layer of the reinforcing protective layer (71) formed by cement-based or gypsum-based polymer-modified mortar is coated, use high points of the alignment projecting parts (503, 502) on the cross section of said mould profile (50) as the control points for the thickness of the reinforcing protective layer (7) of the composite panel.

In the prefabrication method of a second preferred technology based on the twelfth basic technology, after applying a reinforcing protective layer (7) formed by cement-based or gypsum-based polymer-modified mortar on one side of the core (9) or after applying a reinforcing protective layer (7) formed by cement-based or gypsum-based polymer-modified mortar on the other side of the core (9), and before the mould detaching step, apply a decorative surface layer (15) on the reinforcing protective layer (7) of said side or said other side, such that it binds with the reinforcing protective layer (7).

DETAILED DESCRIPTION OF THE PREFERRED EMBODIMENTS

In the following description, identical parts have the same names and use the same legends. Corresponding parts have the corresponding names and use the corresponding legends.

Preferred Embodiments of the Prefabricated Thermal Insulating Composite Panel

Figure 1:
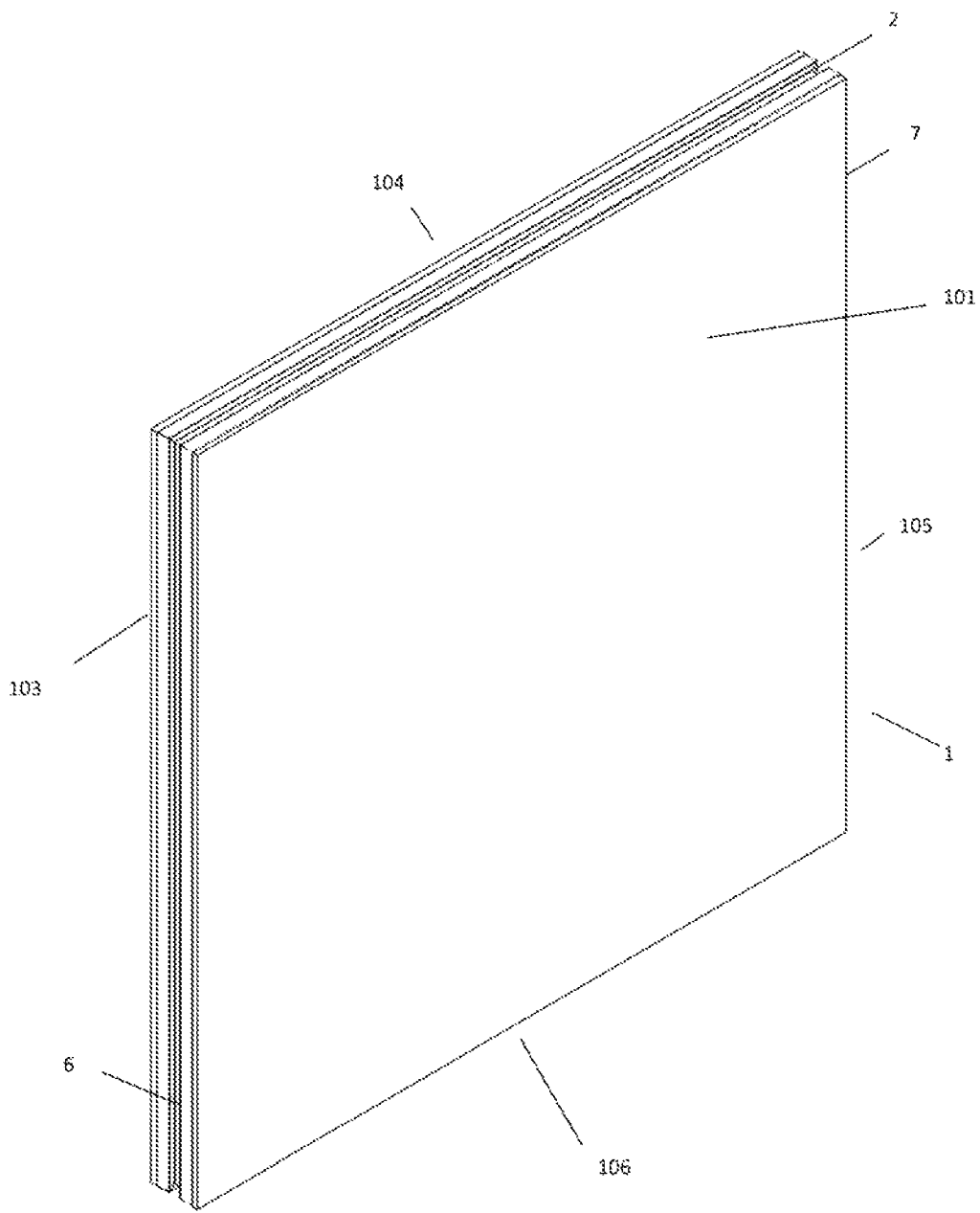
FIG. 1 illustrates the 3-D structure of a preferred embodiment of the prefabricated thermal insulating composite panel according to the present invention.
Figure 2:
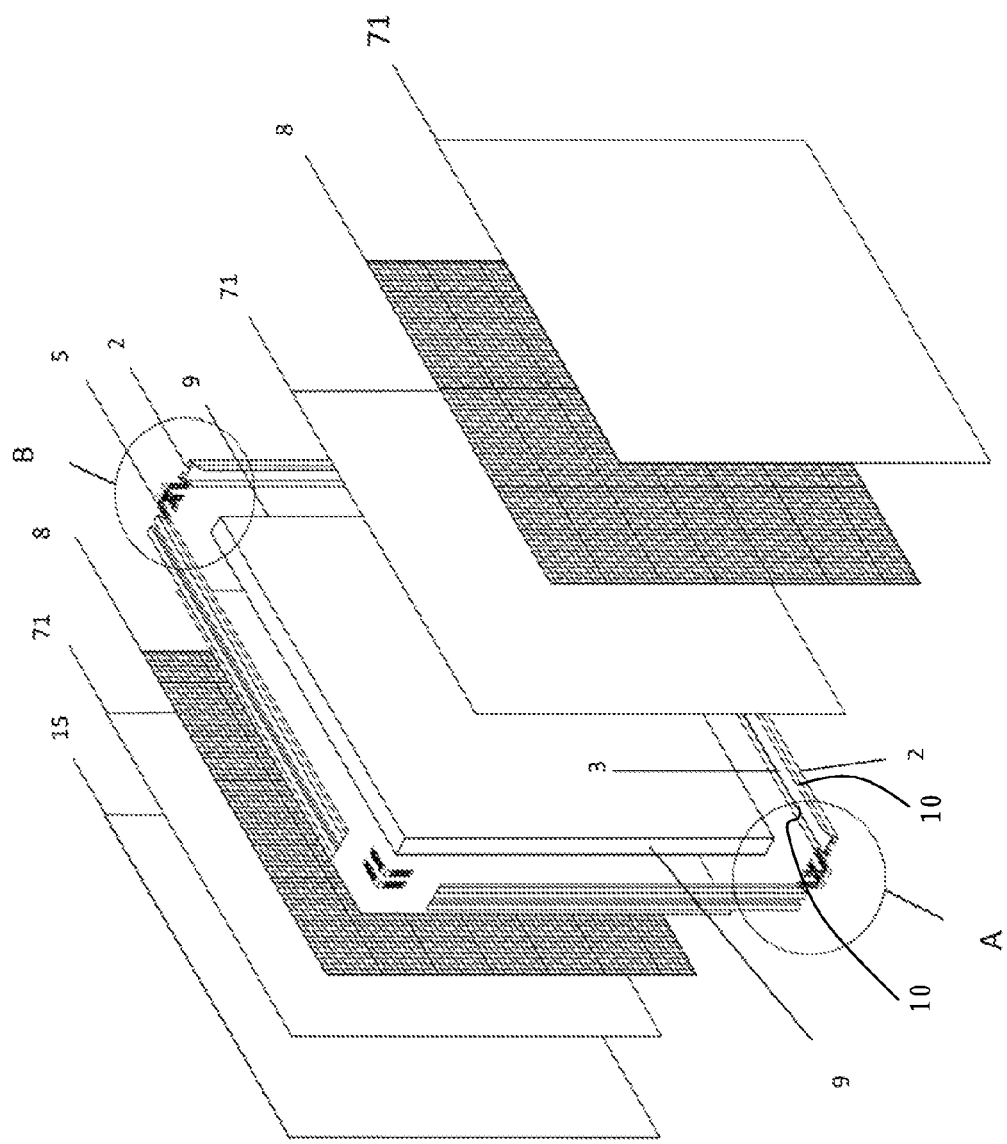
FIG. 2 illustrates the 3-D exploded structure of a preferred embodiment of the prefabricated thermal insulating composite panel according to the present invention.
Figure 3:
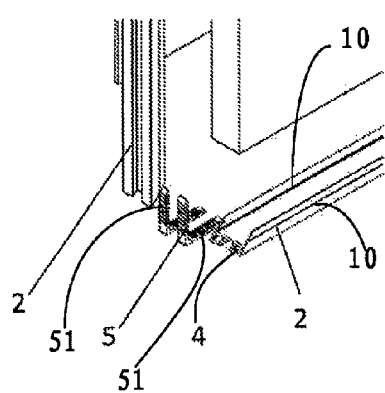
FIG. 3 is the enlarged view of the A portion in FIG. 2.
Figure 4:
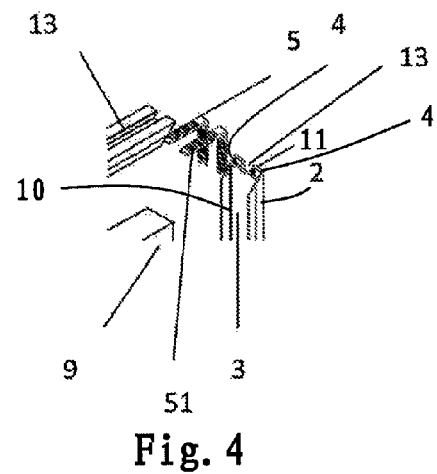
FIG. 4 is the enlarged view of the B portion in FIG. 2.
Figure 5:
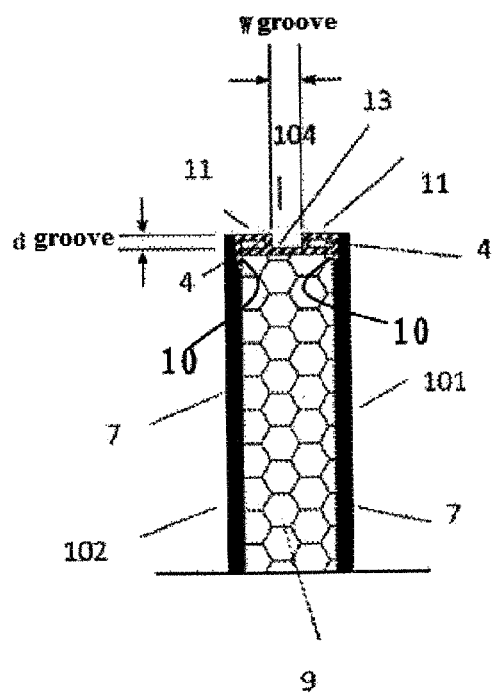
FIG. 5 illustrates the cross-sectional structure of a preferred embodiment of the prefabricated thermal insulating composite panel and a preferred embodiment of the prefabricated thermal insulating composite panel with a corner according to the present invention.
Figure 6:
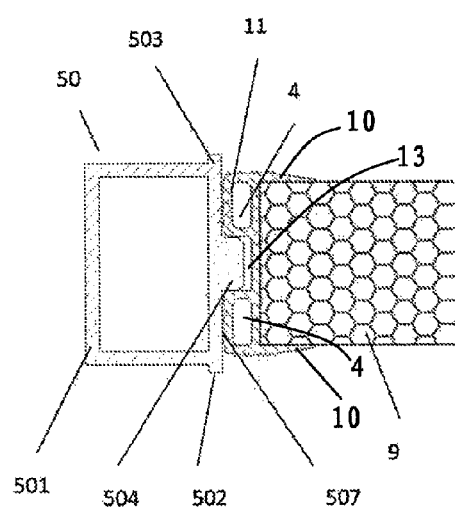
FIG. 6 illustrates the cross-sectional structure when the mould profile for fabricating the prefabricated thermal insulating composite panel or the prefabricated thermal insulating composite panel with a corner of the present invention is assembled with the prefabricated thermal insulating composite panel or thermal insulating composite panel with a corner.

FIGS. 1-7 illustrate a prefabricated thermal insulating composite panel 1 according to a preferred embodiment of the present invention. According to this preferred embodiment, said prefabricated thermal insulating composite panel 1 comprises an internal main surface 101, an external main surface 102, and four side end surfaces 103, 104, 105, 106, in particular as shown in FIGS. 1 and 2. In particular as shown in FIGS. 1-6, in addition to the core 9 made of the thermal insulation panel, said prefabricated thermal insulating composite panel 1 further comprises: two reinforcing protective layers 7 formed by cement-based or gypsum-based polymer-modified mortar and a frame 2. The core 9 is a high performance organic thermal insulation panel, such as polystyrene, polyurethane, phenolic aldehydes, etc., or an inorganic thermal insulation material, such as mineral wool panel, foam glass, foam ceramics, etc., or a super thermal insulation material, such as vacuum thermal insulation panel. According to the design thermal requirements, panels with different thicknesses may be used to provide corresponding heat resistance. Typically, organic thermal insulation materials have better thermal insulating properties and more extensive applications than inorganic thermal insulation materials. The material for the reinforcing protective layer 7 is a cement-based or gypsum-based polymer-modified mortar, which is an inorganic non-combustible material and can provide excellent protection to the core 9. The core 9 is disposed between said two reinforcing protective layers 7 and said two reinforcing protective layers are bonded with said core 9. The frame 2 surrounds the periphery of the core 9 and is fastened to the core 9. Inside the internal main surface 101 and the external main surface 102 of said prefabricated thermal insulating composite panel, the reinforcing protective layers cover the frame 2 such that the frame 2 is exposed only at the four side end surfaces 103, 104, 105, 106 of said prefabricated thermal insulating composite panel. The frame 2 comprises two frame connection parts 11 at the external side of the frame 2 and disposed at the top and bottom of the frame, respectively, and an installation groove 13 at the external side of said frame and disposed between said two frame connection parts 11, and said installation groove extends along the entire frame length. As shown in FIGS. 5 and 6, the internal side of the frame 2 refers to the side that contacts the core 9 (i.e. the lower side in FIG. 5 and the right side in FIG. 6), while the external side of the frame 2 refers to the side that contacts the mould profile 50 in the fabrication process and where, during the assembly of a plurality of prefabricated thermal insulating composite panels, these panels connect with one other (i.e. the upper side in FIG. 5 and the left side in FIG. 6). As shown in FIGS. 5 and 6, the top and bottom of the frame are relative to the top and bottom in FIG. 6. In terms of FIG. 5, the top in FIG. 6 corresponds to the right in FIG. 5, while the bottom in FIG. 6 corresponds to the left in FIG. 5.

In terms of the other object of the invention, the thermal insulating panel that forms the core 9 may also be made of an inorganic thermal insulation material. In this case, the prefabricated thermal insulating composite panel of the present invention still has the advantageous effects of improving strength and integrity, facilitating assembly operation and improves construction efficiency.

Each reinforcing protective layer 7 may comprise a reinforcing material embedded therein, said reinforcing material may comprise a reinforcing net 8 formed by alkali-resistant glass fiber, carbon fiber or steel fiber, or may comprise alkali-resistant chopped glass fiber, carbon fiber or steel fiber that is evenly distributed in the reinforcing protective layers. Alternatively, the reinforcing material may comprise both the reinforcing net 8 and the alkali-resistant chopped glass fiber, carbon fiber or steel fiber that is evenly distributed in the reinforcing protective layers. The reinforcing material may effectively improve the composite panel properties, such as bending resistance and impact resistance.

As shown in FIGS. 2-3, in the prefabricated thermal insulating composite panel of said preferred embodiment, said frame 2 comprises four frame profile segments. The frame profile is an extruded profile. In the process of composite panel production, the frame 2 can also play a role in size limiting and surface layer thickness control, and a role in protecting edges and corners of prefabricated thermal insulating composite panels during transportation and storage. During construction, by inserting embedding strips 166, 169, 177, 178 into installation grooves 13 of the frame 2, the assembly of the panels has accurate positioning and a good smoothness can be ensured after the assembly. In practical applications, said frame profile reliably connects the prefabricated composite panel to the main structure through tension bolts. Both end surfaces of each frame profile segment are inclined planes such that the ends of the four frame profile segments can be assembled in pairs through butt joint to form a complete frame 2. Each frame profile segment is formed integrally. Each frame profile segment comprises two fixing wings 10 and a core fixing groove 3. The two fixing wings 10 are at the internal side of said frame profile and disposed at the top and bottom of the frame profile, respectively (relative to FIG. 6). The core fixing groove 3 is at the internal side of said frame profile and disposed between the top and bottom two fixing wings 10 (relative to FIG. 6). As shown in FIGS. 3-6, each of said two frame connection parts 11 is formed with a frame connection hole 4. Each of the edges of the four sides of said core 9 of said prefabricated thermal insulating composite panel is inserted, respectively, into the core fixing groove 3 of a frame profile segment, and the two fixing wings 10 of each frame profile segment clamp to be fixed onto one of the four edges of said core 9.

A frame profile reinforcing member 5 is shown in FIGS. 2-4. Every two frame profile segments with the ends thereof connected through butt joint are connected through two frame profile reinforcing members 5. In practical applications, for a complete frame formed by assembling four frame profile segments, at least one frame profile reinforcing member 5 is disposed between the connecting ends of every two segments to connect the two segments. Of course, those skilled in the art may conceive that frame profile reinforcing members 5 just needs to be disposed between the head and tail ends of said frame profile. The frame profile reinforcing member 5 comprises two insert connection parts 51, said two insert connection parts 51 are inserted, respectively, into the adjacent frame connection holes 4 of every two adjacent frame profile segments and fixed into the frame connection holes 4 so as to connect the four frame profile segments to form a whole piece. The frame profile reinforcing member provides reliable connection and smooth transition for the panel in this embodiment and the prefabricated having a corner to be described below at the corner. The frame profile reinforcing member just needs to be inserted into the groove hole that has been formed in advance on the frame.

In said preferred embodiment, the installation groove 13 is disposed in the middle relative to said two frame connection parts 11, and said core fixing groove 3 is disposed in the middle on the internal side of said frame relative to said two fixing wings.

As shown in FIG. 2, the prefabricated thermal insulating composite panel of said preferred embodiment further comprises a decorative surface layer 15. The decorative surface layer 15 is disposed at the external side of the reinforcing protective layer 7 at the external side of said prefabricated thermal insulating composite panel and is bonded with said reinforcing protective layer 7.

The reinforcing protective layer 7 in FIG. 2 appears to be two reinforcing protective layers 71, which is an illustrative figure to facilitate the description of the structural composition and fabrication method. The size of the prefabricated thermal insulating composite panel of said embodiment is a modular size that complies with the building standardization to facilitate the fabrication at factories, assembly during construction, and standardized construction. Standard composite panels are determined according to the building mould quantity system. Due to the diversity in practical projects, however, composite panels with non-standard sizes will be needed. A computer aided design program may be used to calculate the amounts and sizes of standard panels, standard prefabricated composite panels with a corner to be described below, non-standard panels, and non-standard prefabricated composite panels with a corner for use in projects.

The prefabricated thermal insulating composite panel of said preferred embodiment is square or rectangular, and its size and weight are set to facilitate the manual transport and operation by construction workers.

The prefabricated thermal insulating composite panel of said preferred embodiment has the following property indexes:

Comparison of Strength of Different Materials

| Material name | Thickness mm | Maximum bending load N | Bending strength MPa | Remarks |
|---|---|---|---|---|
| Core of extruded polystyrene | 50 | 250 | 0.45 | |
| Prefabricated thermal insulating composite panel of the present invention | 40 | 1200 | 54 | 10 mm in total with the top and bottom protective layers |
| Veneer plywood used as concrete forms of the prior art | 15 | 1150 | 23 | |
| Blockboard, long grained | 18 | 2350 | 33 | |
| Blockboard, wide grained | 18 | 750 | 10 | |

Note:
testing method all specimens have a width of 100 mm, the span is 300 mm.

Figure 7:
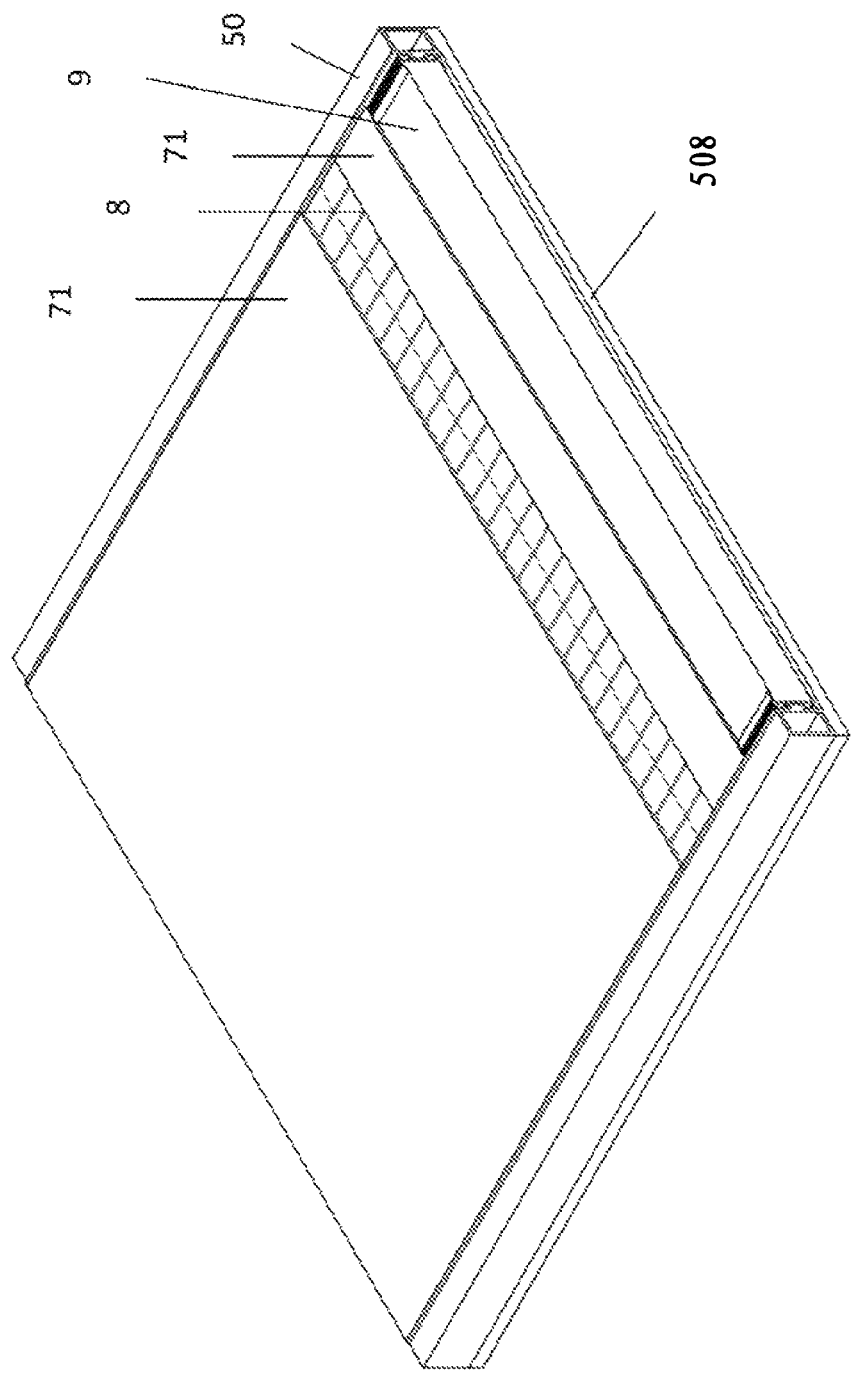
FIG. 7 illustrates the 3-D structure when the mould profile for fabricating the prefabricated thermal insulating composite panel or the prefabricated thermal insulating composite panel with a corner of the present invention is assembled with the prefabricated thermal insulating composite panel or thermal insulating composite panel with a corner.
Figure 8:
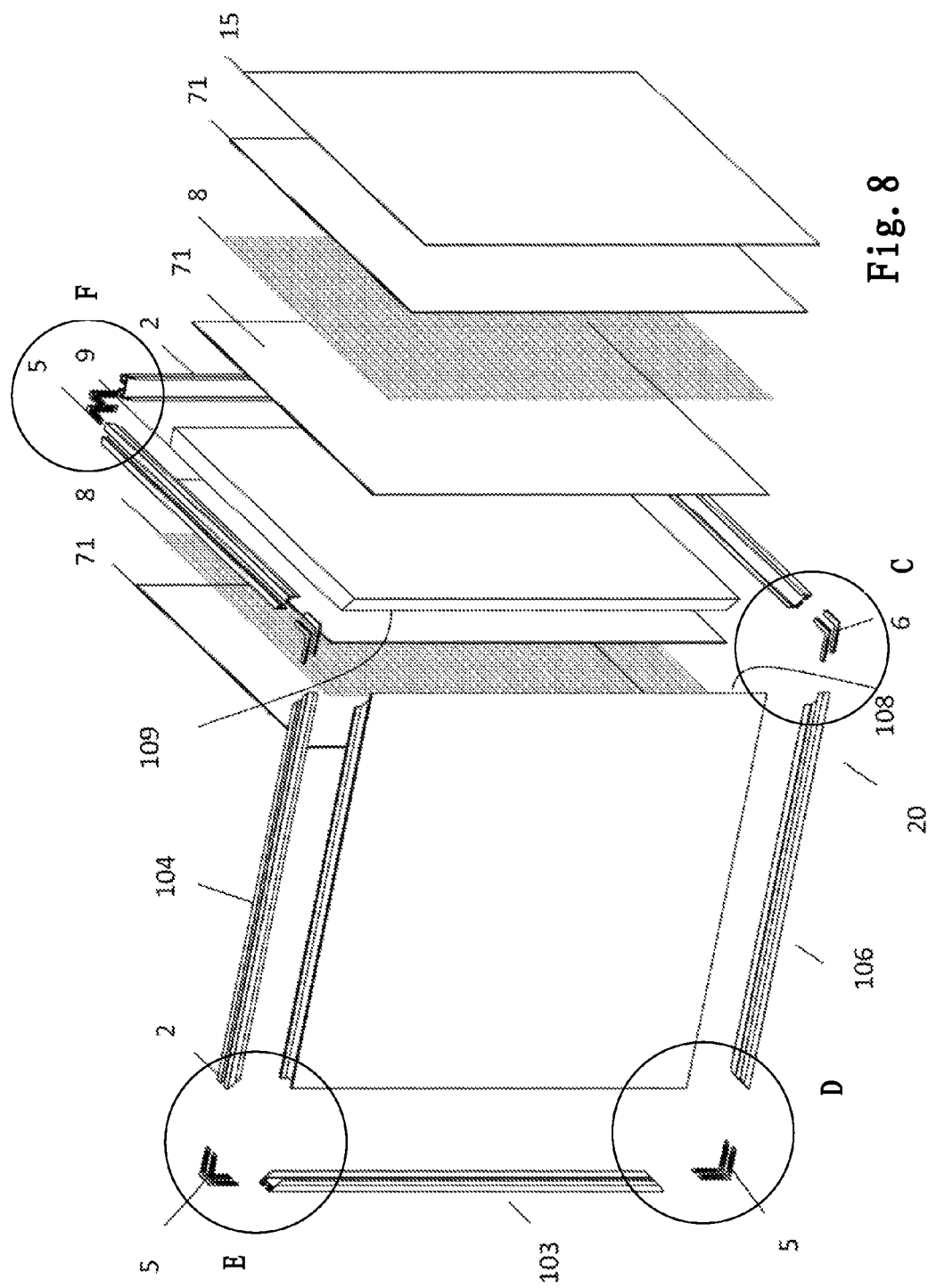
FIG. 8 illustrates the 3-D exploded structure of a preferred embodiment of the prefabricated thermal insulating composite panel with a corner according to the present invention.
Figure 9:
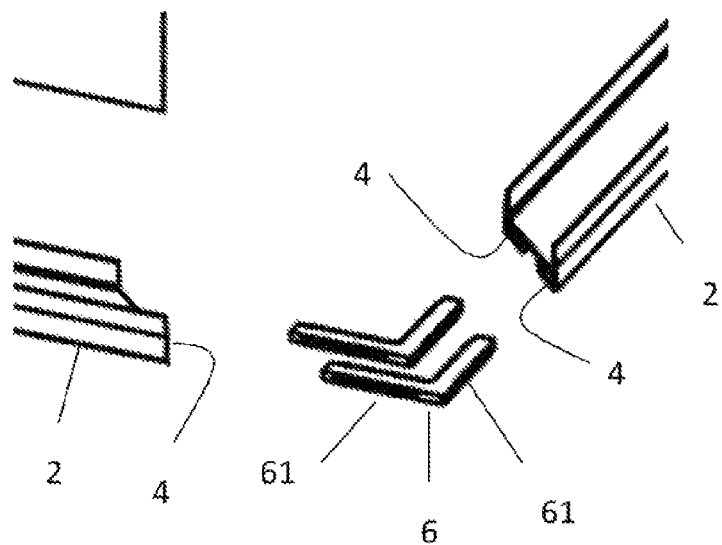
FIG. 9 is the enlarged view of the C portion in FIG. 8.
Figure 10:
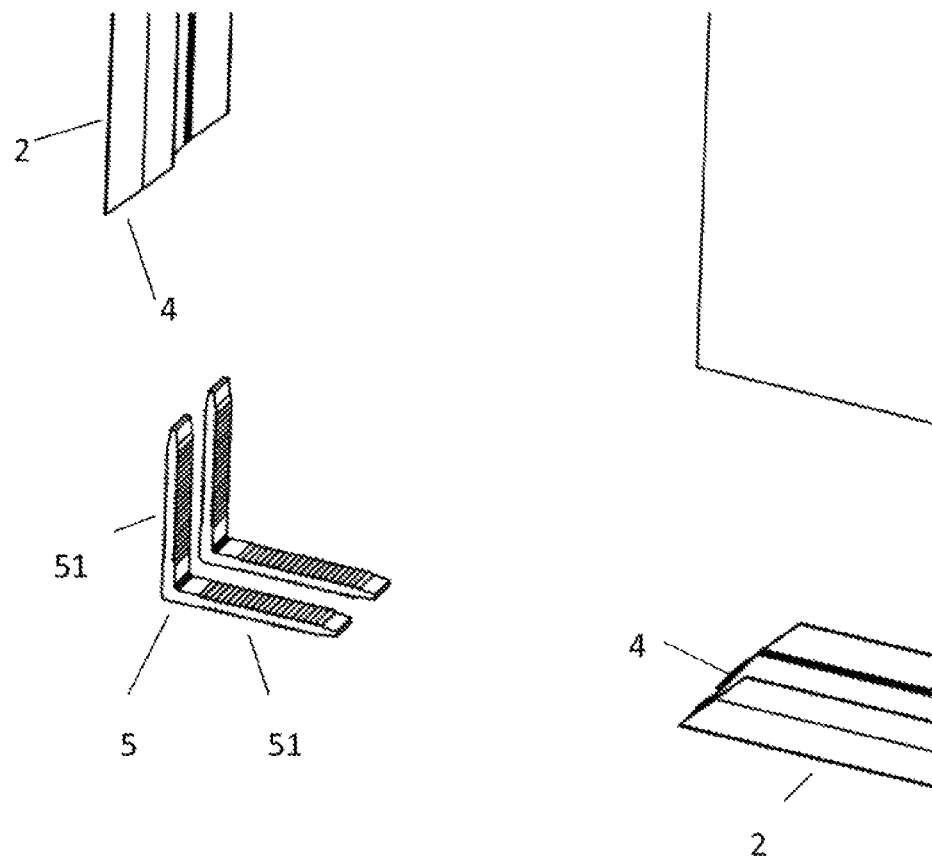
FIG. 10 is the enlarged view of the D portion in FIG. 8.
Figure 11:
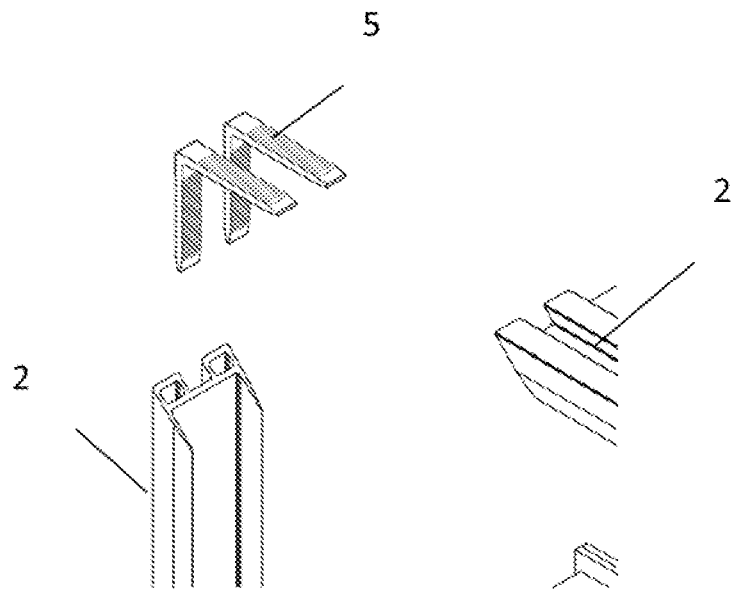
FIG. 11 is the enlarged view of the E portion in FIG. 8.
Figure 12:
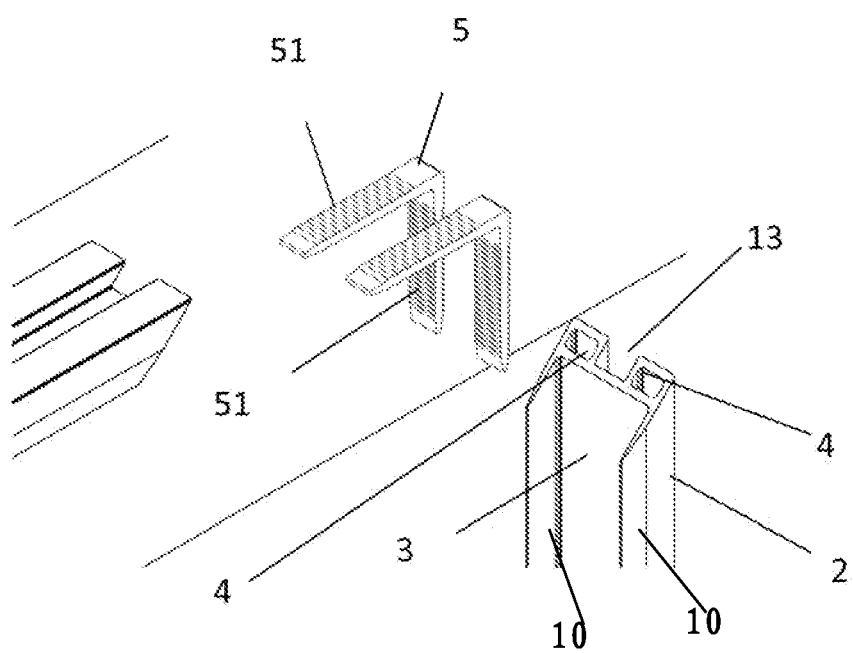
FIG. 12 is the enlarged view of the F portion in FIG. 8.

Preferred Embodiments of the Prefabricated Thermal Insulating Composite Panel with a Corner FIGS. 8-12 illustrate a prefabricated thermal insulating composite panel with a corner 20 according to another preferred embodiment of the present invention. It should be understood that the structure of said prefabricated thermal insulating composite panel with a corner is very similar to the structure of the prefabricated thermal insulating composite panel 1 that does not have a corner shown in FIGS. 1-7, and they are identical in many aspects. However, said prefabricated thermal insulating composite panel with a corner comprises two thermal insulating composite panel parts to form the corner. Each of said two thermal insulating composite panel parts comprises an internal main surface 101, an external main surface 102 and four side end surfaces. One side end surface of said four side end surfaces is formed to be inclined planes 108, 109 that incline relative to the internal main surface 101 and the external main surface 102 of said thermal insulating composite panel part. The two inclined planes 108, 109 have the same size and same inclination angle for mutual cooperation, the two thermal insulating composite panel parts are connected at the inclined planes through butt joint such that the two thermal insulating composite panel parts are disposed in two different planes, respectively, and said two different planes intersect each other, as shown in FIG. 8. Each thermal insulating composite panel part comprises a core 9 made of the thermal insulation panel, two reinforcing protective layers 7 formed by cement-based or gypsum-based polymer-modified mortar and a frame 2. The core 9 is disposed between said two reinforcing protective layers 7, and said two reinforcing protective layers 7 are bonded with said core 9. The frame 2 is disposed on three sides of the three side end surfaces 103, 104, 106 other than the side end surface that is formed to have said inclined planes of said thermal insulating composite panel part of the core 9 and is fastened to the core 9. Inside each surface of the internal main surface and the external main surface of said prefabricated thermal insulating composite panel with a corner 20, said reinforcing protective layers cover said frame such that said frame is exposed only at said three side end surfaces 103, 104, 106 of said prefabricated thermal insulating composite panel part of said prefabricated thermal insulating composite panel with a corner. The frame 2 comprises two frame connection parts 11 at the external side of said frame and disposed at the top and bottom of the frame, respectively, and an installation groove 13 at the external side of said frame and disposed between said two frame connection parts 11, and said installation groove extends along the entire frame length. Refer to FIG. 6 to understand the external side and internal side of the frame herein.

The angle of the corner of the prefabricated thermal insulating composite panel with a corner can be determined according to the building elevation design requirement, which can be adjusted theoretically from 0 degree to 180 degrees. This panel can be used at wall corners, door and window opening edges and eaves.

The preferred embodiment of the reinforcing material of the reinforcing protective layer 7 in a preferred embodiment of the prefabricated thermal insulating composite panel according to the present invention that has been described above can similarly be used for said prefabricated thermal insulating composite panel with a corner.

Refer to FIGS. 8-12 below. As shown in these figures, the structure of the prefabricated thermal insulating composite panel with a corner according to said preferred embodiment is identical with the structure of the prefabricated thermal insulating composite panel that does not have a corner in many aspects. In the prefabricated thermal insulating composite panel with a corner, the frame 2 included in each of said thermal insulating composite panel part comprises three frame profile segments, both end surfaces of each frame profile segment are inclined planes such that the ends of the six frame profile segments can be assembled in pairs through butt joint to form a complete frame 2. Each frame profile segment is formed integrally. Each frame profile segment comprises two fixing wings 10 at the internal side of said frame profile and disposed at the top and bottom of the frame profile, respectively, and a core fixing groove 3 at the internal side of said frame profile and disposed between said two fixing wings 10 (see FIG. 6 to understand the internal side and external side of the frame profile, and the top and bottom of the frame, just like the prefabricated thermal insulating composite panel that does not have a corner).

Each of the two frame connection parts 11 is formed with a frame connection hole 4, the edges of three sides of the three side end surfaces 103, 104, 106 other than the side end surface that is formed to have said inclined plane of the core 9 of said thermal insulating composite panel part are inserted, respectively, into the core fixing groove 3 of a frame profile segment, and the two fixing wings 10 of each frame profile segment clamp to be fixed onto the edge of one side of the above three sides of said core 9.

Said prefabricated thermal insulating composite panel with a corner further comprises a frame profile reinforcing member 5. In addition to the position of the inclined planes, there are two (alternatively one) frame profile reinforcing members 5 between every two frame profile segments with the ends thereof connected through butt joint at the butt joint position of side end surfaces of every adjacent two frame profile segments. Two insert connection parts 51 included in the frame profile reinforcing member 5 are inserted, respectively, into the adjacent frame connection holes 4 of two adjacent frame profile segments of each thermal insulating composite panel part and fixed into the frame connection holes 4 so as to connect the adjacent frame profile segments to form a whole piece.

In said preferred embodiment, since the composite panel has a corner, the prefabricated thermal insulating composite panel with a corner further comprises a corner frame profile reinforcing member 6. There are two (alternatively one) corner frame profile reinforcing members 6 between two frame profile at the position of the inclined planes and the butt joint position of side end surfaces of the two frame profiles. The corner frame profile reinforcing member 6 comprises a corner insert connection part 61, said corner insert connection part 61 is inserted into the frame connection holes 4 of the two adjacent frames at the position of said inclined planes and fixes the adjacent two frame profiles at the position of said inclined planes where said two thermal insulating composite panel parts are connected through butt joint, thereby fixedly connecting the six frame profile segments of the two adjacent thermal insulating composite panel parts to form a complete frame, and fixedly combining said two thermal insulating composite panel parts to form a whole piece.

More preferred embodiments of all aspects, including the installation groove 13, the core fixing groove 3, the decorative surface layer 15, the selection of reinforcing protective layer materials, the selection of reinforcing materials, the composition of thermal insulating panel that forms the core 9, and sizes and shapes of the composite panel, of a preferred embodiment of the prefabricated thermal insulating composite panel of the present invention that has been described above, as well as further advantageous effects thereof, are similarly applicable to the prefabricated thermal insulating composite panel with a corner, which will not be described again herein.

Figure 13:
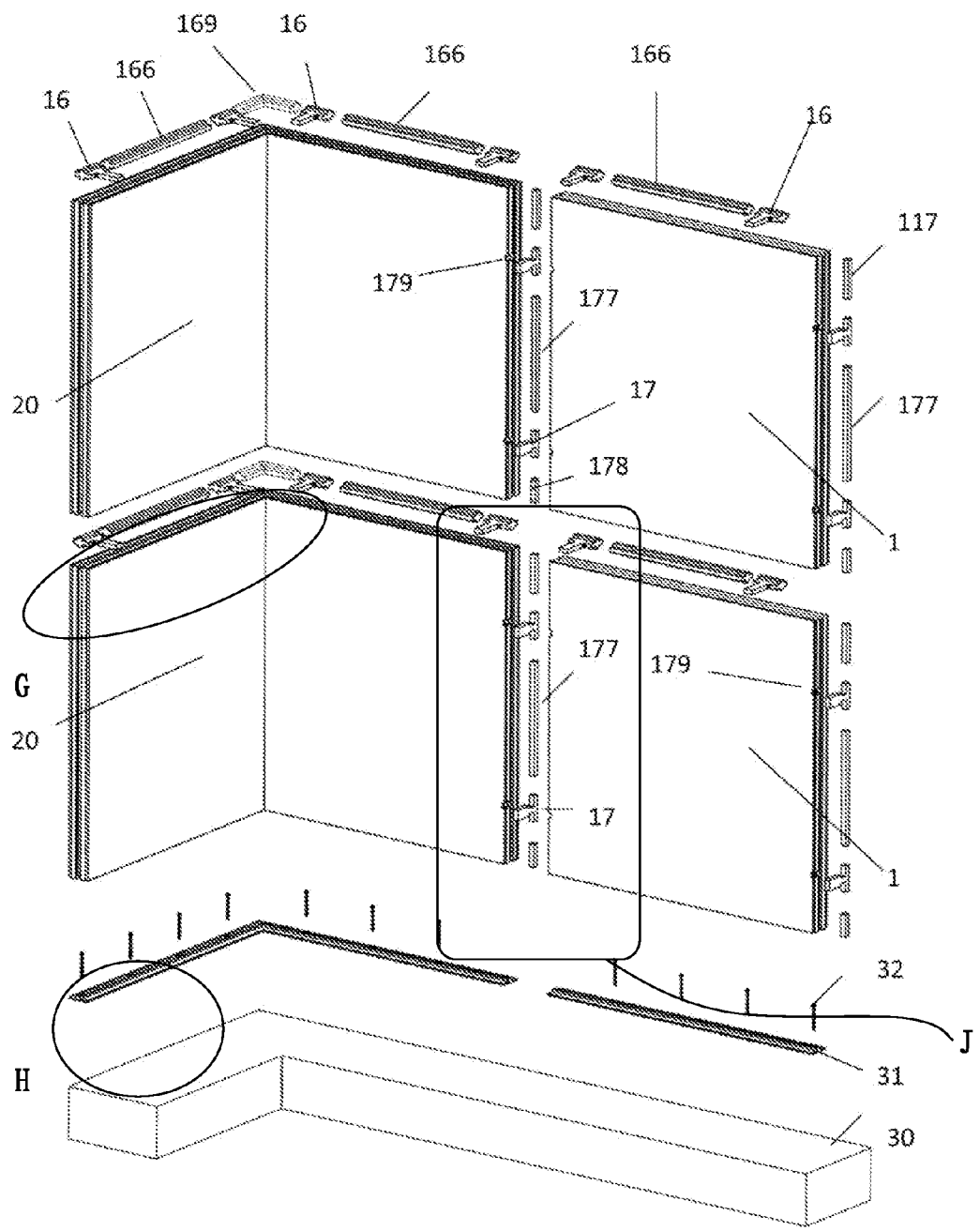
FIG. 13 illustrates the 3-D structure of a preferred embodiment of the thermal insulating composite panel structural assembly according to the present invention.
Figure 14:
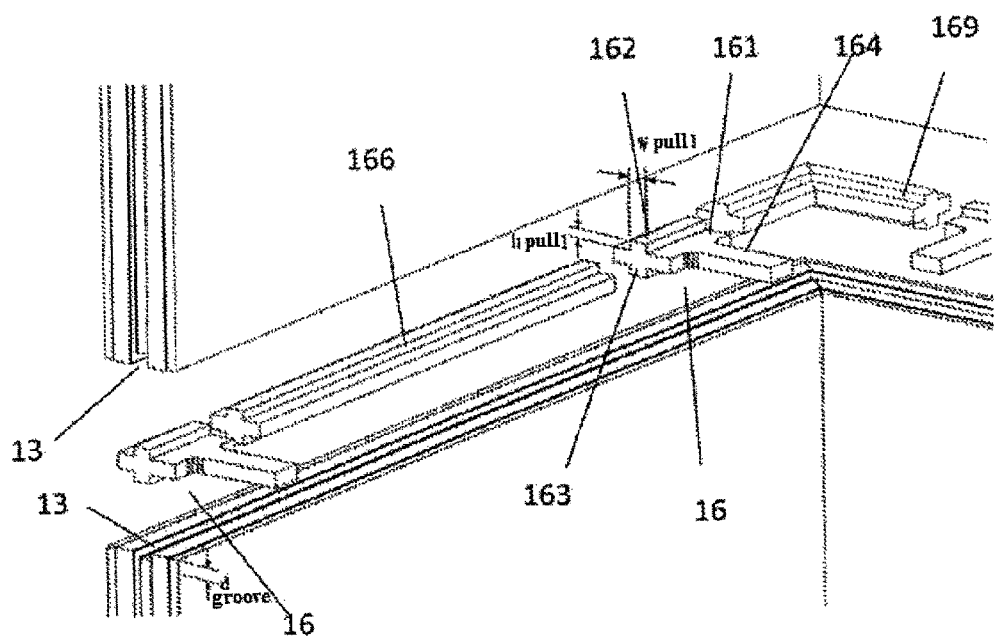
FIG. 14 is the enlarged view of the G portion in FIG. 13.
Figure 15:
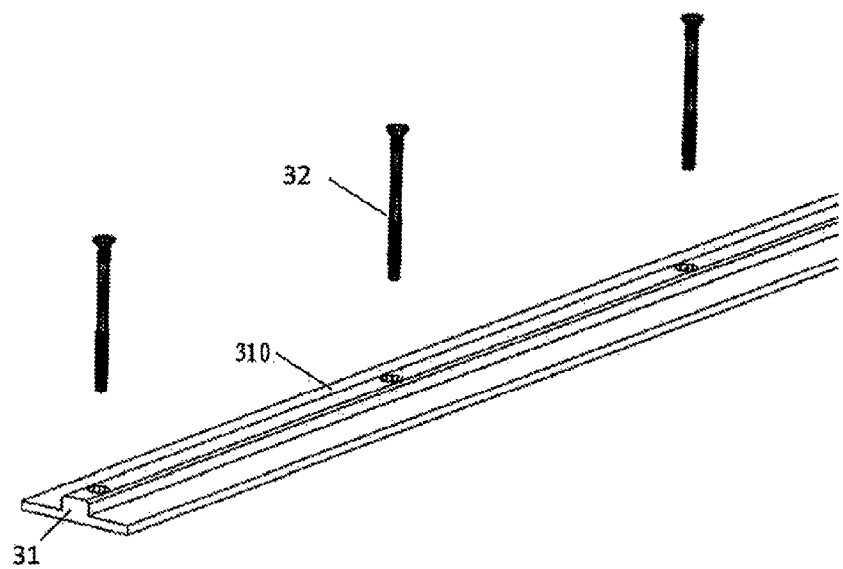
FIG. 15 is the enlarged view of the H portion in FIG. 13.
Figure 16:
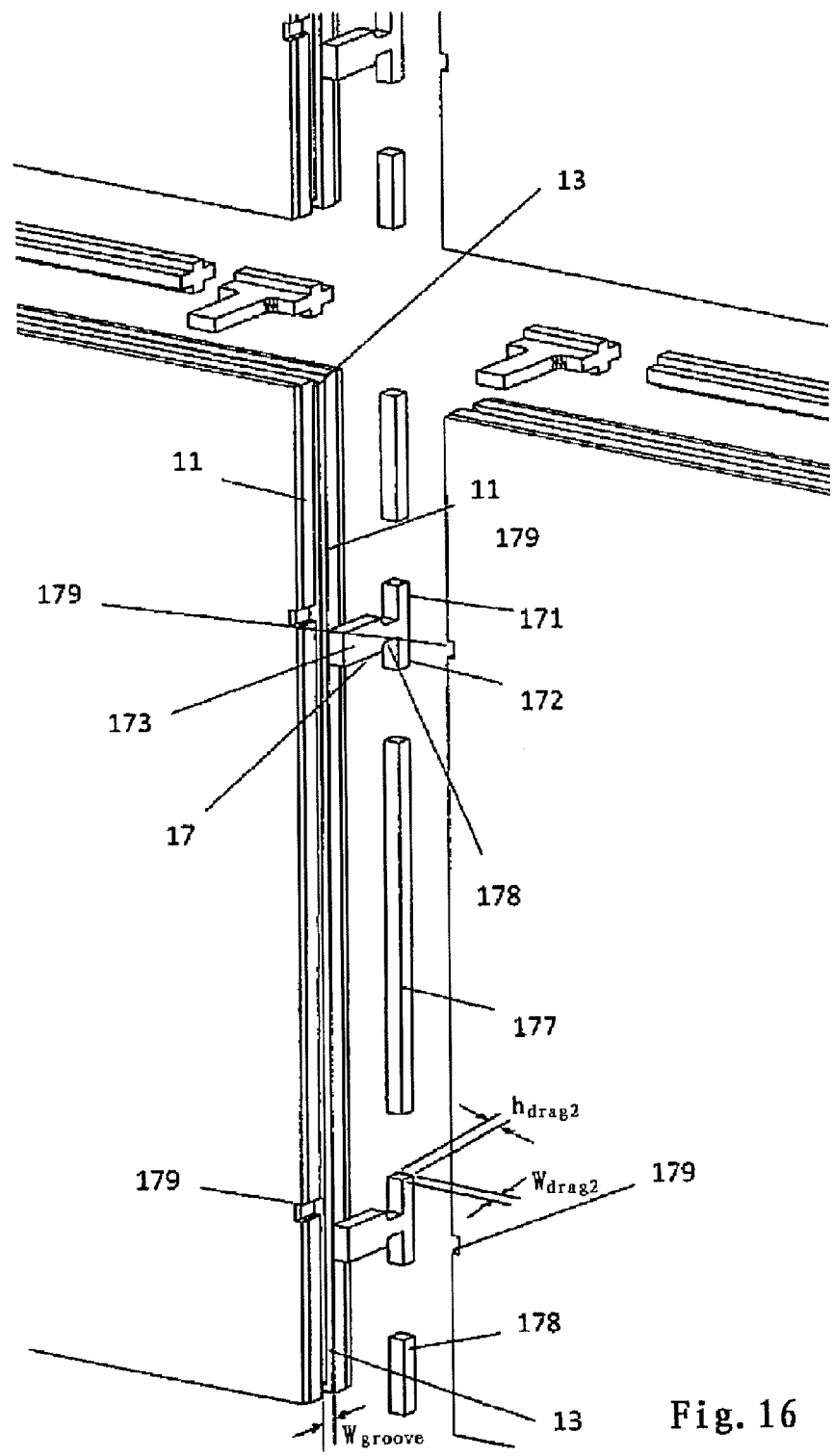
FIG. 16 is the enlarged view of the J portion in FIG. 13.

Preferred Embodiments of a Thermal Insulating Composite Panel Structure Assembly of the Present Invention Refer to FIGS. 13-16 below. These figures illustratively show a thermal insulating composite panel structure assembly according to a preferred embodiment of the present invention. Said thermal insulating composite panel structure assembly may be used to build walls or floor (e.g. roof). Said thermal insulating composite panel structure assembly comprises a plurality of prefabricated thermal insulating composite panels 1 that have been described above and a plurality of prefabricated thermal insulating composite panels with a corner 20 that have been described above. Of course, it should be understood that if the corner of a built wall does not use the prefabricated thermal insulating composite panels with a corner of the present invention, said thermal insulating composite panel structure assembly may also not include the prefabricated thermal insulating composite panels with a corner 20. As shown in FIG. 13, a plurality of prefabricated thermal insulating composite panels 1 are assembled by means of butt joint of side end surfaces. The structure assembly consisted of said prefabricated thermal insulating composite panels further comprises a plurality of tension connection members 16 and 17. As shown in FIGS. 14 and 16, the tension connection member 16 comprises installation groove embedding parts 162, 163 and a projecting part 164, while the tension connection member 17 comprises installation groove embedding parts 171, 172 and a projecting part 173. Installation groove embedding parts 162, 163, 171, 172 are embedded into the installation grooves 13 of said prefabricated thermal insulating composite panels, the projecting parts 164, 173 project out of said installation grooves 13 and extend toward said internal main surface 101 and beyond the internal (i.e. the indoor side of the wall) main surface 101, and through the connection cooperation between said plurality of tension connection members 16, 17 and said installation grooves 13, said plurality of prefabricated thermal insulating composite panels are assembled together.

Both the tension connection members and embedding strips may be injection moulded pieces made of plastics. The role of the tension connection members is to position adjacent composite panels 1, 20 through the cooperation with the installation grooves of the adjacent composite panels 1, 20 having installation grooves, such that the composite panels 1, 20 are assembled together, and at the same time, can connect the assembled composite panels 1, 20 with other structures, such as concrete form support structure and building main load-carrying structure. The role of embedding strips is to position adjacent composite panels 1, 20 through the cooperation with the installation grooves of the adjacent composite panels 1, 20 having installation grooves, such that the composite panels 1, 20 are assembled together. By combining the tension connection members and/or embedding strips with the prefabricated composite panels of the present invention, a plurality of (the amount to be determined as needed, e.g. the wall area or floor area) the prefabricated composite panels of the present invention may be assembled together. Consequently, a brand new building structure and construction method can be provided. Said building structure and construction method is characterized by assembly, which noticeably saves procedures and time for a construction site. If the size of composite panels is set to facilitate the manual transport and operation by construction workers, the demand for large lifting equipment will be further reduced.

In said preferred embodiment, the height and thickness of the prefabricated thermal insulating composite panels with a corner 20 are equal to the height and thickness of the prefabricated thermal insulating composite panels 1, respectively, the installation grooves 13 of said prefabricated thermal insulating composite panels with a corner 20 have the same size as the installation grooves 13 of said prefabricated thermal insulating composite panels 1 such that standardized assembly can be carried out. Side end surfaces of said prefabricated thermal insulating composite panel with a corner 20 are connected with side end surfaces of said prefabricated thermal insulating composite panels 1 in pairs through butt joint, and through the connection cooperation between a plurality of tension connection members 16, 17 and said installation groove 13, said prefabricated thermal insulating composite panels with a corner 20 and said prefabricated thermal insulating composite panels 1 that are adjacent and connected through butt joint are assembled together through the tension connection member 17, and every two adjacent prefabricated thermal insulating composite panels with a corner 20 are assembled together through the connection cooperation between the tension connection member 16 and said installation groove 13.

As shown in FIGS. 14 and 16, in said embodiment, the tension connection members 16, 17 of the thermal insulating composite panel structure assembly substantially appear to be of a T shape, said installation groove embedding parts 162, 163, 171, 172 are formed at the top portion of said T shape when it is placed vertically, said projecting part is formed at the bottom portion of said T shape when it is placed vertically, the cross-sectional shape of the installation groove embedding parts 162, 163 of the tension connection member 16, and the installation groove embedding parts 171, 172 of the tension connection member 17 is consistent with the cross-sectional shape of said installation groove 13 such that the installation groove embedding part 162, 163, 171, 172 and said installation groove 13 cooperate mutually.

As shown in FIGS. 14 and 16, in the thermal insulating composite panel structure assembly of said preferred embodiment, the tension connection member 16 is a seamed tension connection member 16 and the tension connection member 17 is a seamless tension connection member 17. The seamed tension connection member comprises a body 161, the projecting part 164 of said seamed tension connection member is located in the same plane as said body 161 of said seamed tension connection member. The installation groove embedding parts 162, 163 of said seamed tension connection member extend beyond the surface in which said projecting part and said body of said seamed tension connection member are located along a direction perpendicular to the surface in which said projecting part 164 and said body 161 of said seamed tension connection member are located, such that they can extend into the installation groove 13 during assembly. As shown in FIG. 14, in the structure assembly, said seamed tension connection member is disposed inside a horizontal seam formed by the butt joint of every two adjacent prefabricated thermal insulating composite panels. The cross-sectional widths $W_{1a1}$, $W_{1a2}$ of the installation groove embedding parts of said seamed tension connection member and said seamless tension connection member are equal to the width $W_{groove}$ of the installation groove of the prefabricated thermal insulating composite panel, and the cross-sectional height $h_{1a1}$ of the installation groove embedding part of said seamed tension connection member is equal to or smaller than the depth $d_{groove}$ of the installation groove for mutual cooperation. As shown in FIG. 16, the cross-sectional height $h_{1a2}$ of the installation groove embedding parts 171, 172 of said seamless tension connection member is equal to the sum of the depths $d_{groove}$ of two installation grooves 13 of two prefabricated thermal insulating composite panels that are connected through butt joint for mutual cooperation. The seamless tension connection member comprises a necking part 178, and said necking part is disposed between said installation groove embedding part 171 and said projecting part 173. The cross-sectional width of the necking part is smaller than the cross-sectional width of said projecting part. The entire seamless tension connection member has the same thickness. A slot 179 is formed along one of the two vertical frame connection parts 11 of each of every two prefabricated thermal insulating composite panels 1 that are adjacent laterally or the prefabricated thermal insulating composite panel 1 and the prefabricated thermal insulating composite panel with a corner 20 that are adjacent laterally. Two adjacent slots 179 are opposite each other, the width of said slot is equal to the width of said necking part, and the sum of the depths of two slots is equal to the thickness of said necking part for mutual cooperation.

In the thermal insulating composite panel structure assembly of said preferred embodiment, seamed embedding strips 166, 169 are placed into the horizontal seam between adjacent prefabricated thermal insulating composite panels 1 and/or prefabricated thermal insulating composite panels with a corner 20, and seamless embedding strips 177, 178 are placed into the vertical seam between adjacent prefabricated thermal insulating composite panels 1 and/or between a prefabricated thermal insulating composite panel 1 and a prefabricated thermal insulating composite panel with a corner 20 such that the butt joint cooperation among the composite panels become better. At the same time, the embedding strips can also connect the adjacent composite panels, and help prevent the relative position shift between the adjacent composite panels, such that the assembled composite panels have better integrity.

The assembly of the prefabricated thermal insulating composite panel and the prefabricated thermal insulating composite panel with a corner of the present invention on a construction site can be carried out according to different flows as required by projects. A preferred flow embodiment is provided below:

When fixing a starting strip 31, the starting strip 31 can be fixed continuously along the periphery of the starting platform (e.g. a horizontal foundation, or a platform formed by treating the existing foundation, or a platform added to the foundation) 30, and it is required that its anchorage with the foundation be reliable and the size be accurate;

The first layer of the composite panels 1, 20 is installed first. The first piece of the prefabricated thermal insulating composite panel with a corner 20 is installed starting from the corner, and the horizontal installation groove 13 at the bottom end of said composite panel 20 is fitted to the projecting embedding part 310 of the starting strip 31;

The second piece of composite panel to be installed is the composite panel 1, place the composite panel 1 tightly against the first piece of composite panel 20, assume that it is seamless assembly vertically and seamed assembly laterally, see FIG. 13, insert seamless embedding strips 177, 178 between the two composite panels, and place seamed embedding strips 166, 169 into the groove at the top end;

When it is necessary to connect with a main structure, place the tension connection members 16, 165 into the installation groove 13 at the top end, or place the tension connection member 17 into the installation groove 13 on the side;

The installation of the second layer of the composite panels 1, 20 also begins at the corner, fit the bottom end installation groove 13 of the prefabricated thermal insulating composite panel with a corner 20 onto the seamed embedding strips 169, 166 of the lower layer composite panel 30, and then install the second piece of composite panel 1 of the second layer.

Preferred Embodiments of a Permanent Concrete Form of the Present Invention

The present invention further proposes a permanent concrete form. The permanent concrete form according to one preferred embodiment of the present invention may comprise the prefabricated thermal insulating composite panel and/or the prefabricated thermal insulating composite panel with a corner that has been described above, and may comprise the thermal insulating composite panel structure assembly that has been described above. Said permanent concrete form may be used as permanent concrete forms for building buildings and structures. It firmly and integrally binds with the concrete structure when the concrete completely sets to form a reliable thermal insulating layer that has the same life as the building.

Preferred Embodiments of a Concrete Slab Structural Member of the Present Invention Refer to FIGS. 17-22 below. These figures illustratively show a concrete slab structural member according to a preferred embodiment of the present invention. In said preferred embodiment, said concrete slab structural member is a wall slab structural member. After reading the Description, however, those skilled in the art should understand that it may also be used for roof slabs and floor slabs with thermal insulating requirements. Said concrete slab structural member comprises a reinforcing bar, a first concrete form disposed at one side of said reinforcing bar, a second concrete form disposed at the other side of said reinforcing bar, and concrete disposed between said first concrete form and said second concrete form (not shown). The first concrete form is external concrete form, the external concrete form is permanent concrete form, including the thermal insulating composite panel structure assembly that has been described above, and the thermal insulating composite panel structure assembly is fixedly connected with said reinforcing bar via the projecting part of said tension connection member 16, 17, 165. The second concrete form is regular concrete form and the internal concrete form 92. The concrete binds with the reinforcing bar, the permanent concrete form, and the internal concrete form 92 to form a whole piece. Of course, those skilled in the art should understand that if necessary, the permanent concrete form of the present invention can be used on the internal side or both sides. For example, the internal side thermal insulating method is used for most refrigerators.

In said concrete slab structural member of said preferred embodiment, the reinforcing bar is a cold bend thin wall steel profile keel. However, those skilled in the art should understand that the reinforcing bar may also be a steel bar according to the prior art.

In said preferred embodiment, to highlight the advantageous effects of the standardized assembly of the permanent concrete form of the present invention, a cold bend thin wall steel profile frame is used as the reinforcing bar. Said cold bend thin wall steel profile frame comprises a plurality of longitudinal (vertical in said embodiment) steel profile keels 95, 85 that are spaced apart along the extension direction (lateral, i.e. horizontal direction in said embodiment) of the main surface of the concrete slab structural member and placed in parallel to one another. Each of the longitudinal steel profile keels comprises two longitudinal cold bend thin wall steel profiles 951, 952, 851, 852. The main surfaces of said longitudinal cold bend thin wall steel profiles (i.e. the plane passing through the center of the longitudinal cold bend thin wall steel profiles, perpendicular to paper and extending vertically in FIG. 17) are parallel to the internal main surface and the external main surface of the prefabricated thermal insulating composite panel 1 or the prefabricated thermal insulating composite panel with a corner 20 included in said thermal insulating composite panel structure assembly. The two longitudinal cold bend thin wall steel profiles 951, 952, 851, 852 are spaced apart and opposite each other along a direction perpendicular to the main surface of the concrete slab structural member (i.e. the plane passing through the center of the longitudinal cold bend thin wall steel profiles, perpendicular to paper and extending vertically in FIG. 17), such that a space 200 is left between the two longitudinal cold bend thin wall steel profiles, and consequently the concrete can easily flow through the space left between the two longitudinal cold bend thin wall steel profiles when it is poured. The space left between the two longitudinal cold bend thin wall steel profiles is filled up with concrete (not shown), and both said first concrete form and said second concrete form are fixedly connected with said cold bend thin wall steel profile frame.

Figure 17:
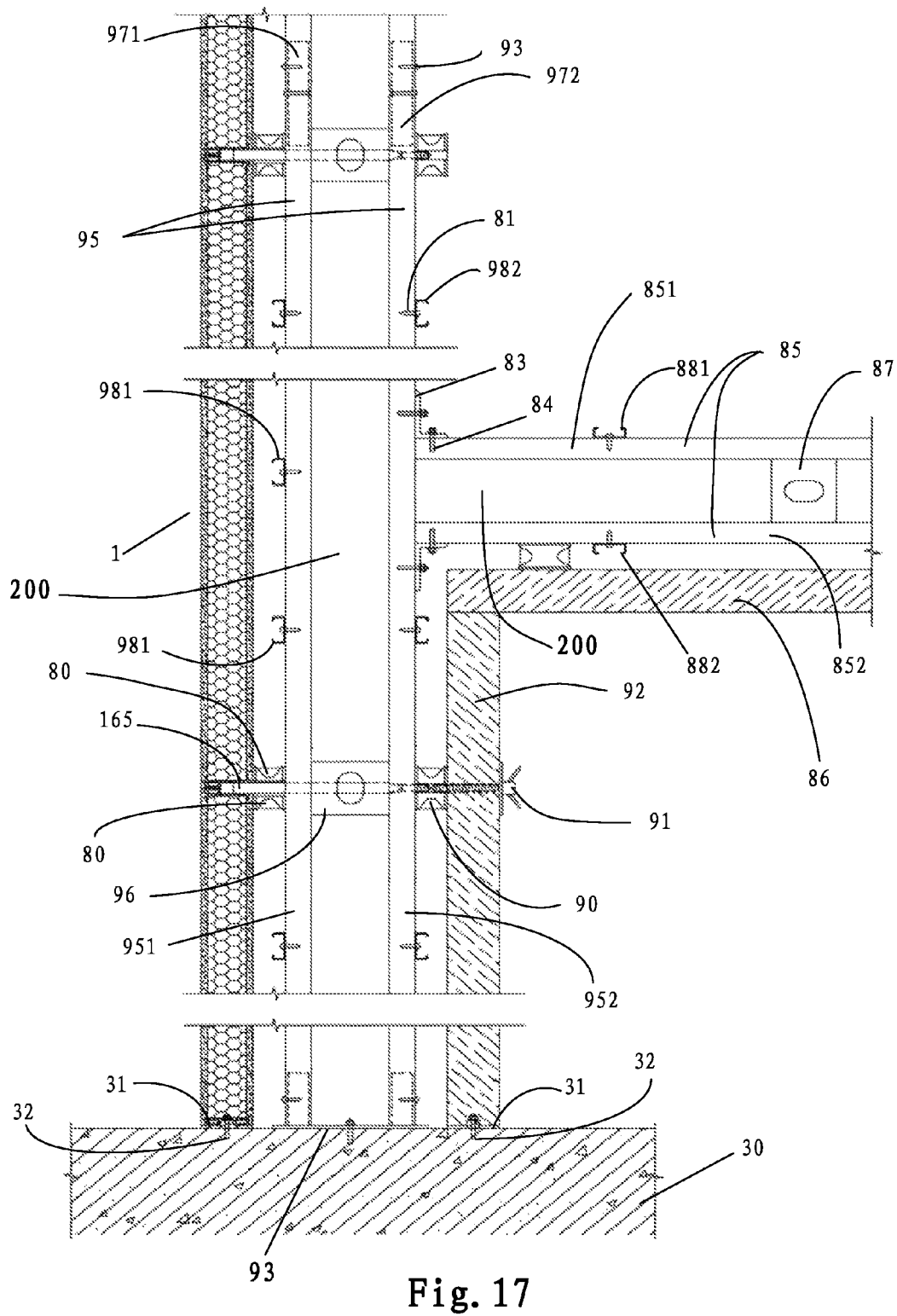
FIG. 17 illustrates the cross-sectional structure of a preferred embodiment of the concrete slab structural member according to the present invention.
Figure 18:
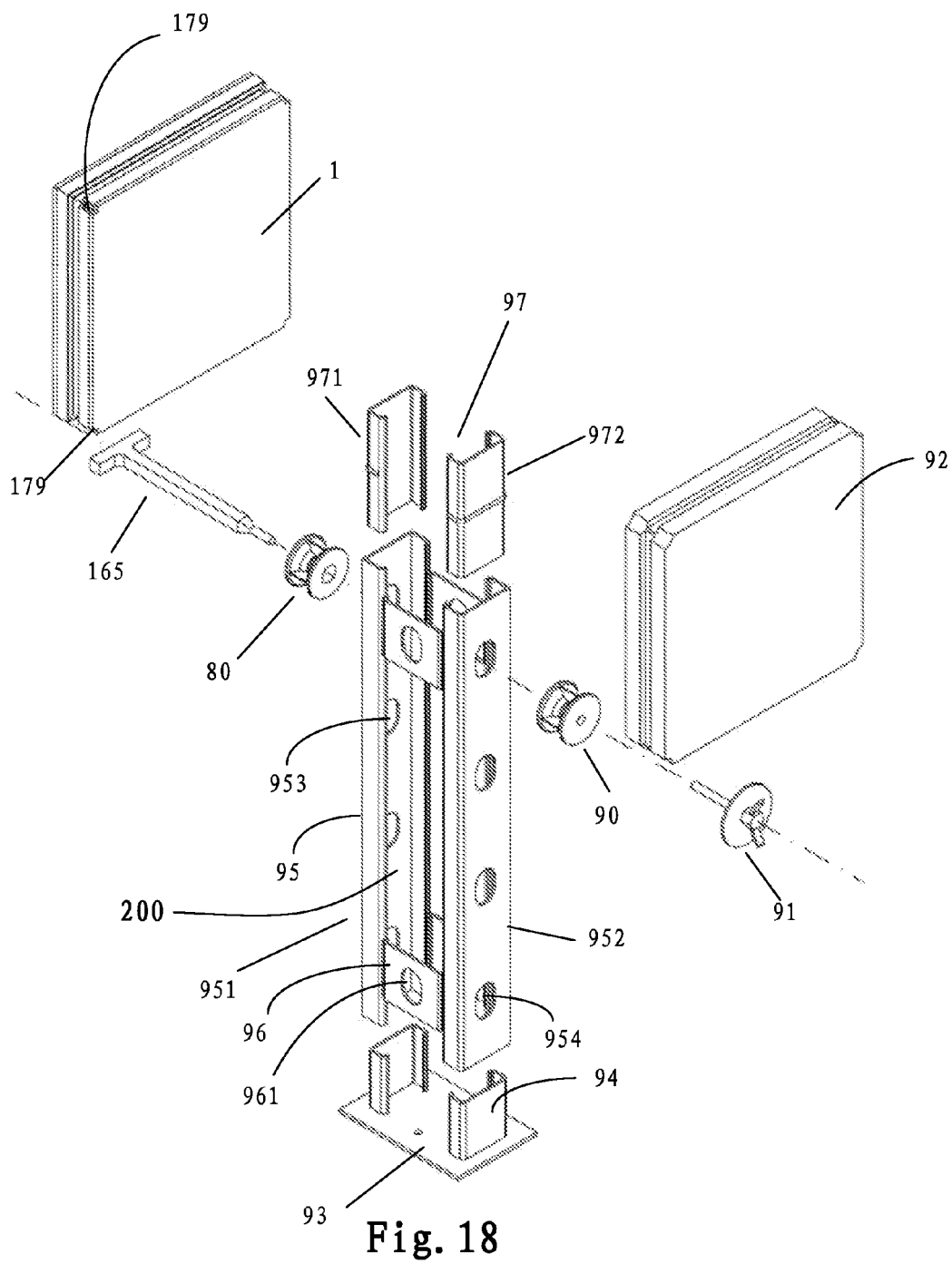
FIG. 18 illustrates the 3-D exploded structure of said preferred embodiment of the concrete slab structural member according to the present invention.
Figures 19, 20:
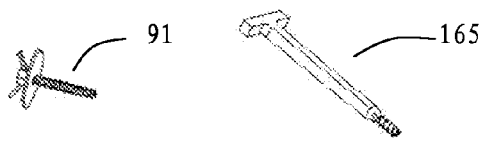
FIG. 19 illustrates the 3-D structure of the tension bolt 91 according to the preferred embodiment.
FIG. 20 illustrates the 3-D structure of the tension connection member 165 according to the preferred embodiment.
Figure 21:
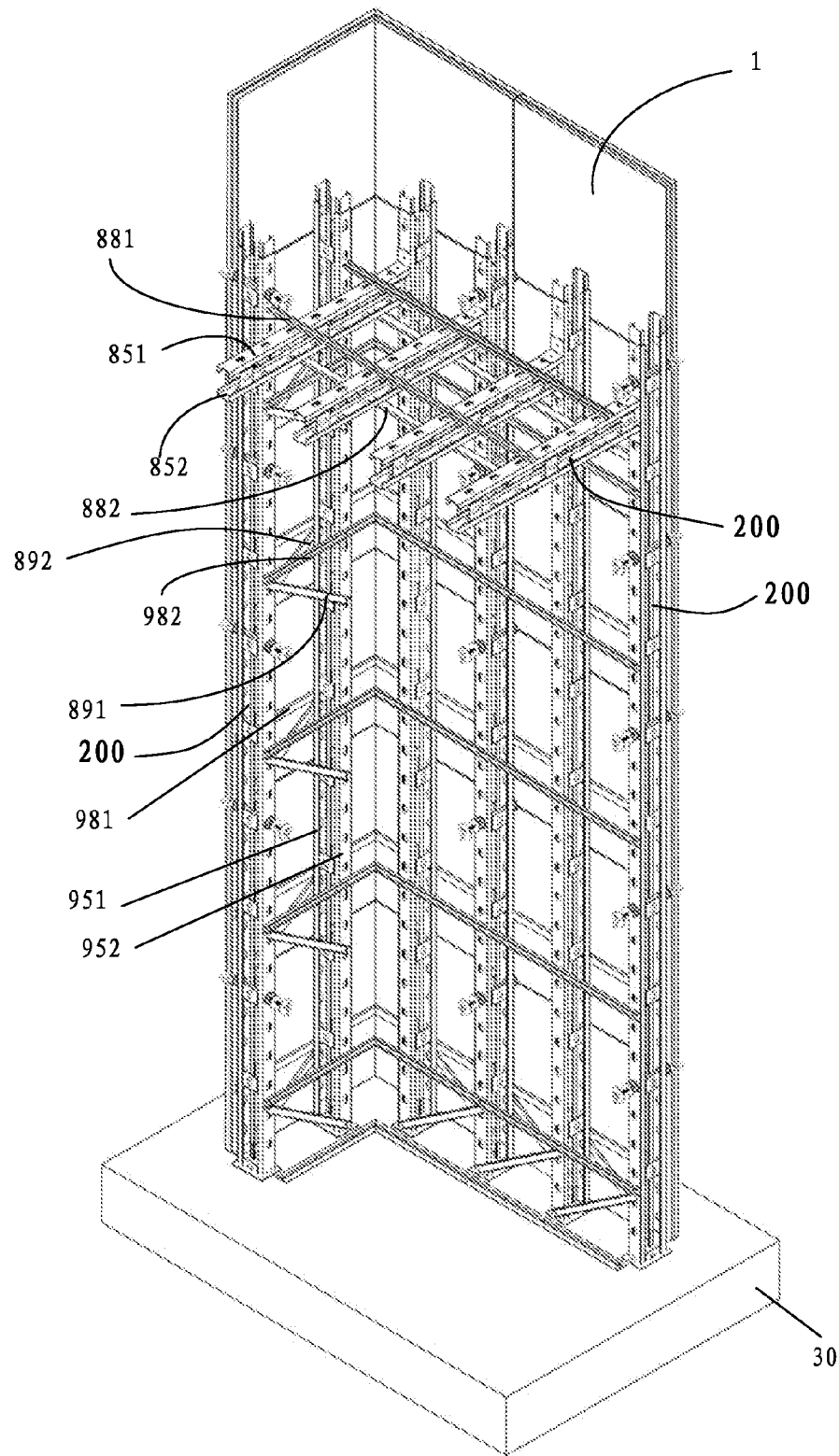
FIG. 21 illustrates the 3-D structure of said preferred embodiment of the concrete slab structural member according to the present invention, and said figure illustratively shows the structure from the internal side of the structural member.
Figure 22:
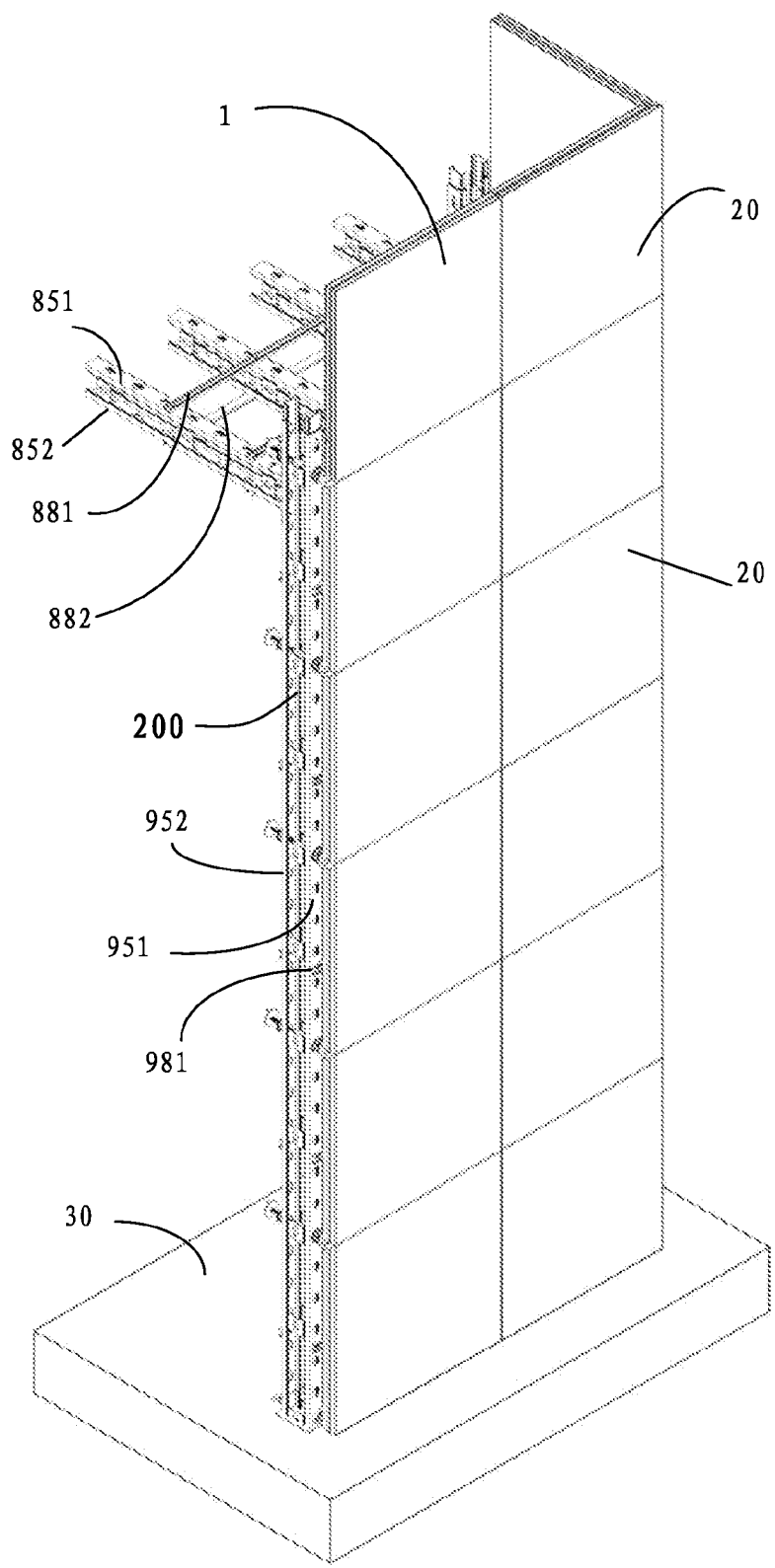
FIG. 22 illustrates the 3-D structure of said preferred embodiment of the concrete slab structural member according to the present invention, and said figure illustratively shows the structure from the external side of the structural member.

In said concrete slab structural member of said preferred embodiment, the two longitudinal cold bend thin wall steel profiles are fixedly connected through steel profile connection members 96, 87, both said first concrete form and said second concrete form are spaced apart from the longitudinal cold bend thin wall steel profiles, and the concrete between said first concrete form and said second concrete form (not shown) covers said cold bend thin wall steel profile frame. The steel profile connection members 96, 87 may be spaced apart along the lengthwise direction of the longitudinal cold bend thin wall steel profiles 951, 952. As shown in FIG. 18, two pairs of steel profile connection members 96 may be disposed between every two longitudinal cold bend thin wall steel profiles 951, 952. The steel profile connection members 96, 87 have steel profile connection member through holes 961 thereon so as to reduce the impact on the flowing of concrete. Longitudinally (vertically in this preferred embodiment), every two adjacent longitudinal steel profile keels are connected through a longitudinal connection keel 97. In the vertically adjacent longitudinal steel profile keels, both two cold bend thin wall steel profiles that form the upper adjacent longitudinal steel profile keel and two cold bend thin wall steel profiles that form the lower adjacent longitudinal steel profile keel have their ends in butt joint fitted over the longitudinal connection steel profiles 971, 972 that form the longitudinal connection keel 97, and fixed thereto. The fixation may be achieved with screws (as shown in FIG. 17) or welding. When two longitudinal cold bend thin wall steel profiles 951, 952 on the top layer connect with two longitudinal cold bend thin wall steel profiles 951, 952 on the bottom layer through butt joint, the longitudinal connection keel 97, as a keel connector, should be first inserted into the main keel on the bottom layer, i.e. the longitudinal steel profile keel 95, and the two are connected with self-tapping screws. Subsequently, the main keel on the top layer, i.e. the longitudinal steel profile keel 95, is fitted over the keel connector, and the two are connected with self-tapping screws.

In said concrete slab structural member of said preferred embodiment, the longitudinal cold bend thin wall steel profiles 951, 952 included in each longitudinal steel profile keel 95 have a plurality of keel through holes 953, 954 distributed along the lengthwise direction thereon. The keel through holes 953, 954 on the two longitudinal cold bend thin wall steel profiles are opposite each other, projecting parts of said tension connection members 16, 17, 165 run through at least some of the keel through holes 953, 954. The running through direction of said keel through holes is perpendicular to the main surfaces of said concrete slab structural member and the internal main surface and the external main surface of the prefabricated thermal insulating composite panel or the prefabricated thermal insulating composite panel with a corner included in said thermal insulating composite panel structure assembly.

As shown in the figures, the concrete slab structural member further comprises a tension bolt 91, a tension sleeve 90 and a limiting sleeve 80. The tension sleeve 90 is disposed between said internal concrete form 92 and the longitudinal cold bend thin wall steel profile of the two longitudinal cold bend thin wall steel profiles included in each longitudinal steel profile keel that is located at the internal side. The limiting sleeve 80 is disposed between said external concrete form and the longitudinal cold bend thin wall steel profile of the two longitudinal cold bend thin wall steel profiles included in each longitudinal steel profile keel that is located at the external side (i.e. the outdoor side relative to the wall). The tension sleeve is an injection moulded piece, which can convey the pressure at the concrete side to the concrete forms on both sides. At the same time, it can also play a limiting role to ensure the effective thickness of the concrete protective layer. The limiting sleeve is an injection moulded piece, which ensures the effective thickness of the concrete protective layer. The tension bolt is a detachable steel bolt that fixes the modular concrete form to the main keel. When the concrete is cured for a sufficient period, the tension bolt and the modular concrete form are detached. The bolt hole on the concrete member may be used as the fixing point for dry construction of decorative surface.

The projecting parts of said tension connection members 16, 17, 165 extend out of said external concrete form and run through said keel through holes to connect with said tension sleeve through threads, thereby fixedly connecting said external concrete form with said longitudinal steel profile keel, and said tension bolt 91 runs through said internal concrete form 92 to connect with said tension sleeve for fixedly connecting said internal concrete form with said longitudinal steel profile keel. See the external threads on the end of the projecting part of said tension connection member 165 and the external threads on the tension bolt 91 illustratively shown in FIG. 19 and FIG. 20. These external threads are used to mesh with the internal threads inside the holes of the tension sleeve 90.

In said preferred embodiment, both of the two longitudinal cold bend thin wall steel profiles included in each longitudinal steel profile keel are C shaped steel profiles. The longitudinal steel profile keels are placed vertically, a plurality of longitudinal steel profile keels placed in parallel are connected via said lateral connection steel profile keel, said diagonal connection steel profile keel is connected with said longitudinal steel profile keels, and said longitudinal steel profile keels, said lateral connection steel profile keel and said diagonal connection steel profile keel are connected to form a stable overall rigid structure. The lateral connection steel profile keel comprises lateral cold bend thin wall steel profiles 981, 982, 881, 882. The diagonal connection steel profile keel comprises diagonal cold bend thin wall steel profiles 891, 892.

In said preferred embodiment, the concrete slab structural member is a concrete wall slab structural member, which may further comprises a starting platform 30 disposed at the bottom. The starting platform may be a building foundation, or other appropriate platform added to the foundation. The starting platform is fixed with a starting strip 31 thereon, and the starting strip 31 has a projecting embedding part 310 that projects upwardly. The lowest installation groove 13 on the lowest prefabricated thermal insulating composite panel and prefabricated thermal insulating composite panel with a corner included in said permanent concrete form cooperates with the projecting embedding part 310 of said starting strip, and the projecting embedding part is embedded into said lowest installation groove. In such a way, it helps the lowest prefabricated thermal insulating composite panel in the permanent concrete form be fixed and positioned on the starting platform 30. The starting strip 31 is an extruded piece.

As shown in FIGS. 17-21, the lowest longitudinal cold bend thin wall steel profiles 951, 952 are fixed onto the starting platform 30 through a starting panel 93. The starting panel 93 is fixed with a starting keel 94 thereon. The starting panel 93 is fixed onto the starting platform 30 through an expansion bolt. The lowest longitudinal cold bend thin wall steel profiles 951, 952 are fitted onto said starting keel 94 and (e.g. through a fastening member (e.g. screw, self-tapping screw) or welding) are fixedly connected with the starting keel 94.

In said preferred embodiment, the vertical main keel, i.e. the longitudinal steel profile keel 95 is formed by welding two opposite C-shaped cold bend thin wall steel profiles 951, 952, 851, 852 with a connection steel panel 96. Both the main keel and the connection steel panel are punched with long round holes and have rolled edges to enhance the rigidity thereof, which is favorable for the concrete to flow freely and become dense and can significantly improve the bonding force between steel profiles and concrete. The lateral auxiliary keel, i.e. the lateral connect profile keel 98 is formed by two C-shaped cold bend thin wall steel profiles 981, 982, 81, 882. The lateral connect profile keel 98 is connected to two sides of the vertical main keel via welding or self-tapping screws such that the entire steel skeleton has a stable structure and accurate size.

The internal concrete form may be a modular concrete form, which is compounded by metal and polymer materials, can be repeatedly used for hundreds of times, and has sufficient rigidity to resist the side pressure from the newly mixed concrete. The external shape and size of the internal concrete form may be consistent with the prefabricated thermal insulating composite panel of the present invention. Notches are formed on its panel corners in advance for tension bolts to run through.

Figure 23:
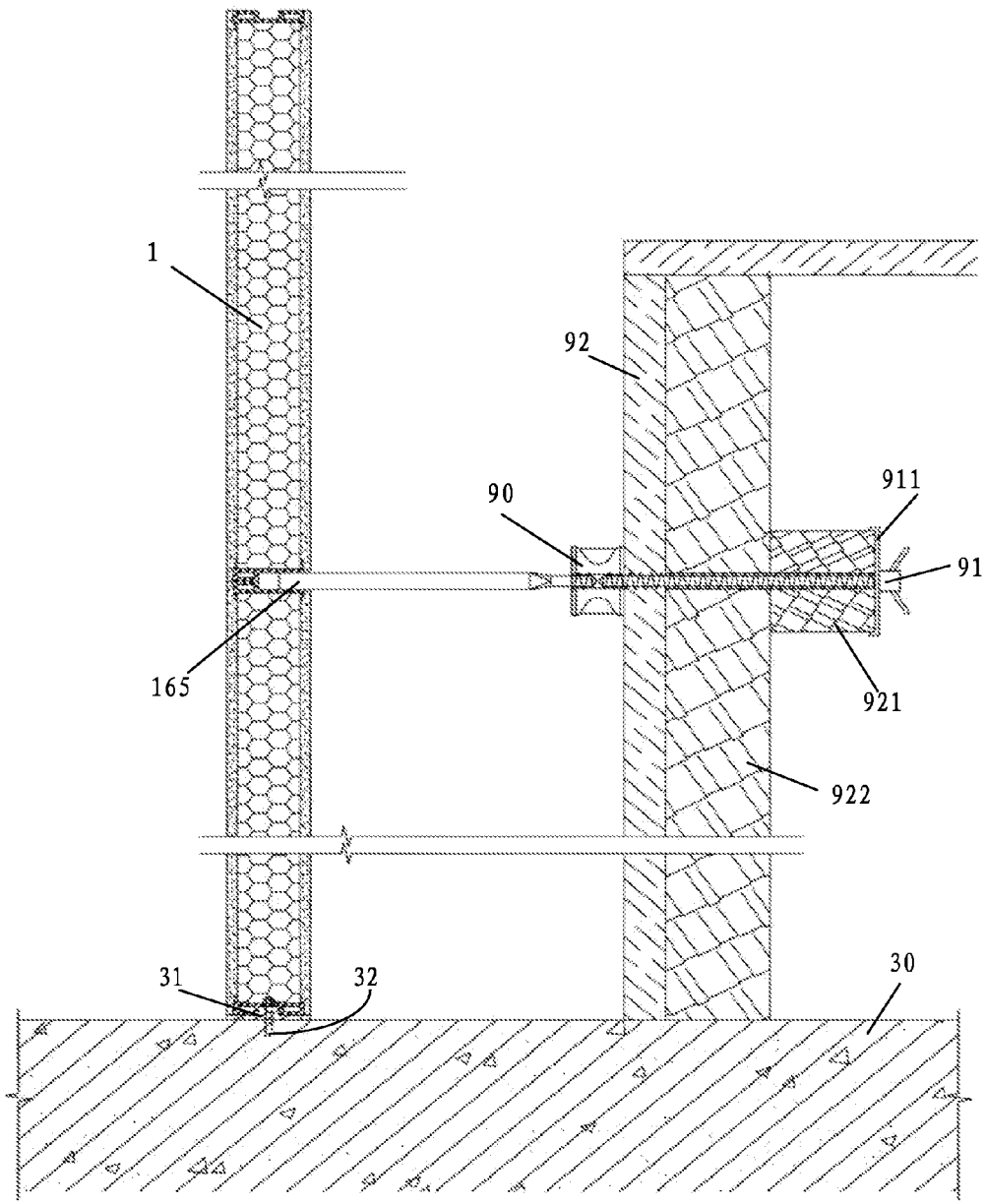
FIG. 23 illustrates the cross-sectional structure of a preferred embodiment of another concrete slab structural member (i.e. wall slab) according to the present invention.
Figure 24:
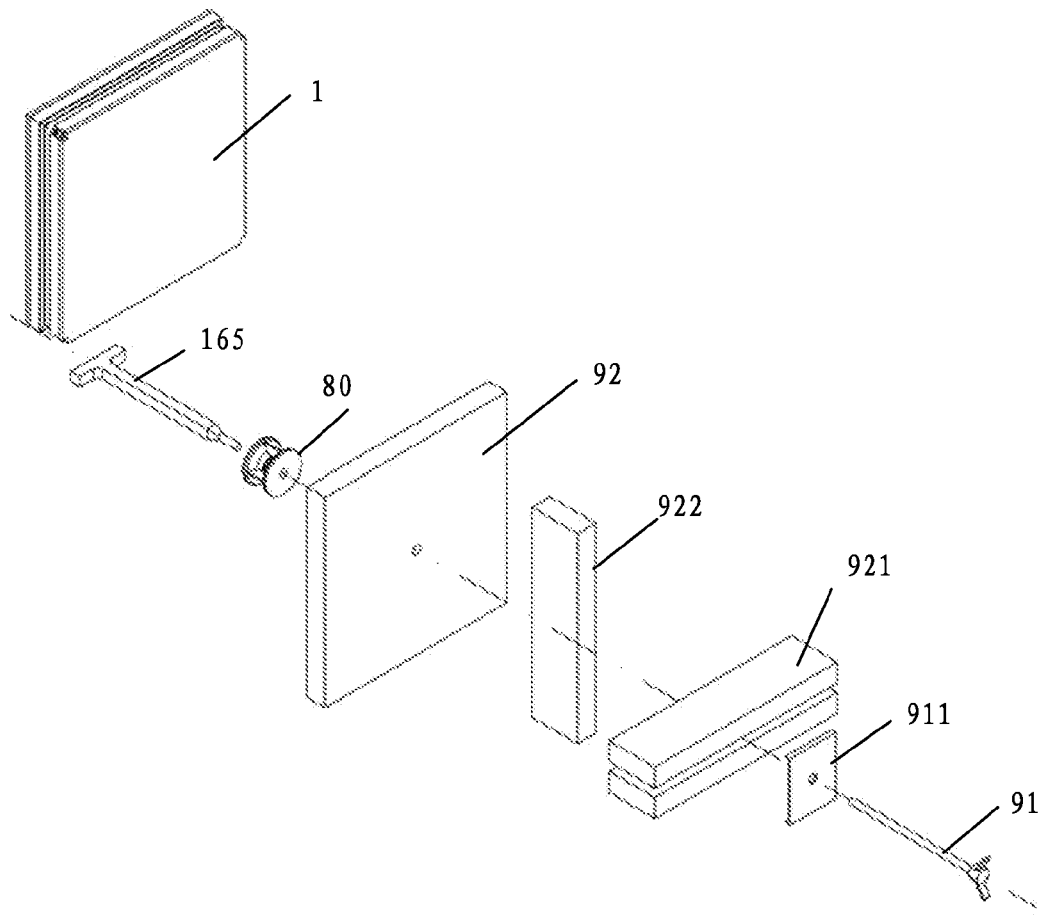
FIG. 24 illustrates the 3-D exploded structure of a preferred embodiment of said another concrete slab structural member according to the present invention.

Preferred Embodiments of a Concrete Wall Slab Structural Member of the Present Invention Refer to FIGS. 23 and 24 below. FIGS. 23 and 24 illustrate the cross-sectional structure of a concrete wall slab structural member according to a preferred embodiment of the present invention. Said concrete wall slab structural member is different from the concrete slab structural member in the above preferred embodiment mainly in that it does not use the cold bend thin wall steel profile frame proposed in the above preferred embodiment of the present invention as the reinforcing bar, but may use the regular reinforcing bar or regular steel profile frame of the prior art as the reinforcing bar, and at the same time, use regular concrete form support of the prior art to support the internal and external concrete forms. Said concrete wall slab structural member comprises a first concrete form disposed at one side of said reinforcing bar, a second concrete form disposed at the other side of said reinforcing bar and concrete disposed between said first concrete form and said second concrete form (not shown in the figures so as to clearly show the structure of the wall slab structural member). In said preferred embodiment, the first concrete form is external concrete form and permanent concrete form. Said permanent concrete form includes the thermal insulating composite panel structure assembly that has been described above, and the thermal insulating composite panel structure assembly is fixedly connected with the concrete form support via the projecting part of said tension connection member 16, 17, 165. The second concrete form is the internal concrete form 92 and a regular detachable concrete form. The concrete binds with the reinforcing bar and the permanent concrete form to form a whole piece.

In said preferred embodiment, the concrete form support of said concrete wall slab structural member comprises a concrete form vertical keel 922 and a concrete form lateral keel 921. Said concrete wall slab structural member further comprises a tension bolt 91 and a tension sleeve 90. The tension sleeve 90 is disposed at the external side of said internal concrete form 92 and adjacent to said internal concrete form. The concrete form vertical keel 922 is disposed at the internal side of said internal concrete form 92 and adjacent to said internal concrete form. The concrete form lateral keel is disposed at the internal side of said concrete form vertical keel and adjacent to said concrete form lateral keel. Starting from the internal side of said concrete form lateral keel, said tension bolt 91 runs through said concrete form lateral keel 921, said concrete form vertical keel 922 and said internal concrete form 92 sequentially to connect with said tension sleeve 90 through threads, thereby fixedly connecting said internal concrete form, said concrete form lateral keel and said concrete form vertical keel. The tension bolt 91 is used with a tension bolt gasket 911 in cooperation. The projecting part of said tension connection member 165 extends out of said external concrete form and runs through to connect with said tension sleeve through threads, thereby fixedly connecting said external concrete form with said internal concrete form, said concrete form vertical keel and said concrete form lateral keel.

Similar to the preferred embodiment shown in FIGS. 17-21 above, the concrete wall slab structural member shown in FIGS. 23 and 24 also comprises a starting platform 30 disposed at the bottom. The starting platform is fixed with a starting strip 31 thereon, and the starting strip 31 has a projecting embedding part 310 that projects upwardly. The lowest installation groove 13 on the lowest prefabricated thermal insulating composite panel and prefabricated thermal insulating composite panel with a corner included in said permanent concrete form cooperates with the projecting embedding part 310 of said starting strip, and the projecting embedding part is embedded into said lowest installation groove.

Preferred Embodiments of a Wall Structural Member of the Present Invention

Figure 25:
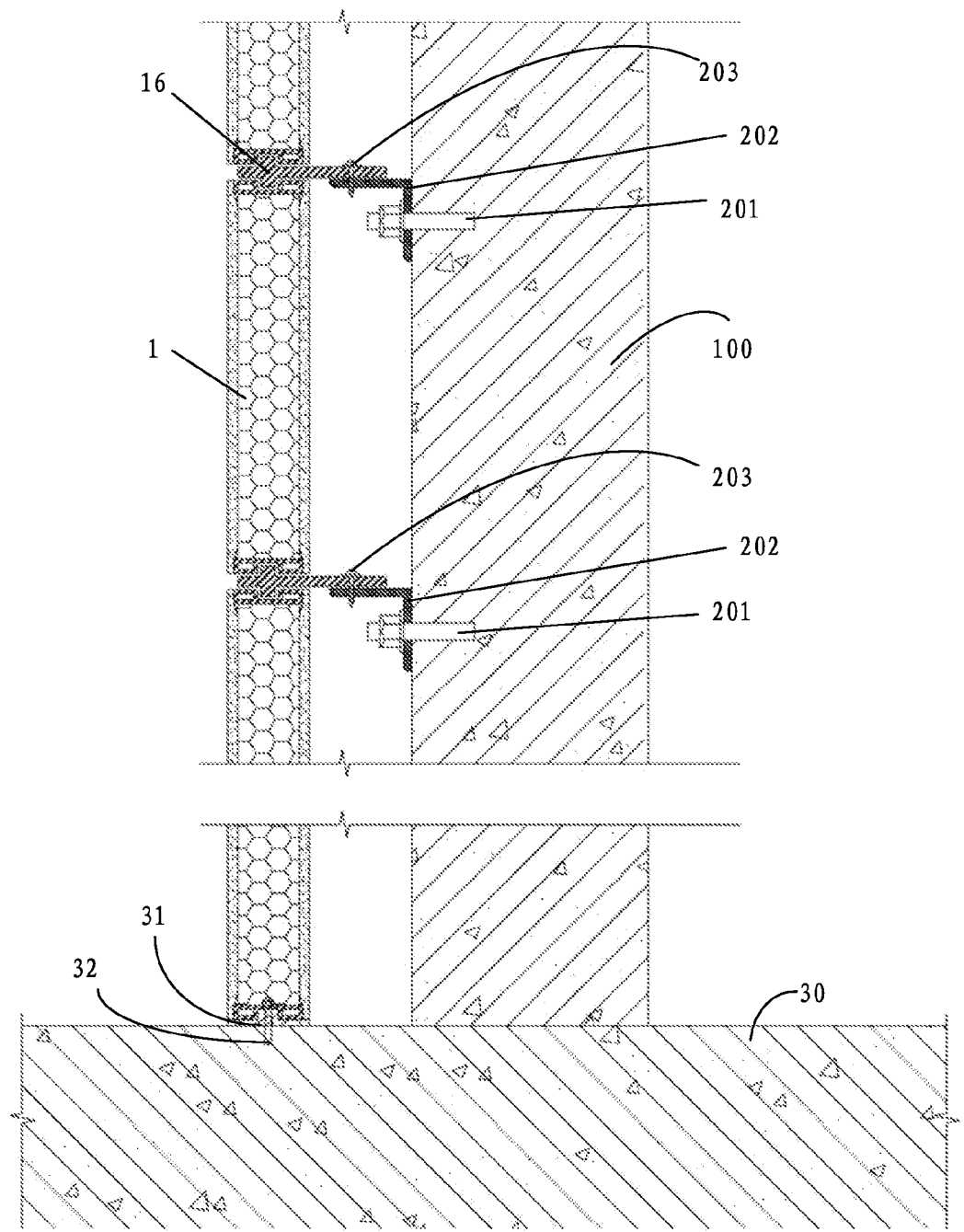
FIG. 25 illustrates the cross-sectional structure of a preferred embodiment of a wall structural member according to the present invention.

FIG. 25 illustrates a wall structural member according to another preferred embodiment of the present invention, which comprises a wall main structure part 100 and a thermal insulating layer part. The thermal insulating layer part is fixedly connected with said wall main structure part 100. The thermal insulating layer part uses the thermal insulating composite panel structure assembly that has been described above. The projecting part of said tension connection member 16, 165 is fixedly connected with said wall main structure part 100 so as to fixedly connect said thermal insulating composite panel structure assembly to said wall main structure part.

In said preferred embodiment, the projecting part of said tension connection member 16 is formed with a fastening hole. The wall main structure part is fixed with a support member 202, and said tension connection member is fixedly connected to said support member 202 through the fastening hole on said projecting part and a fastening member such as a self-tapping screw 203.

Similar to the above preferred embodiment of the concrete wall slab structural member, the wall structural member according to said preferred embodiment further comprises a starting platform 30 disposed at the bottom. The starting platform is fixed with a starting strip 31 thereon, and the starting strip 31 has a projecting embedding part 310 that projects upwardly. The lowest installation groove 13 on the lowest prefabricated thermal insulating composite panel and prefabricated thermal insulating composite panel with a corner included in said permanent concrete form cooperates with the projecting embedding part 310 of said starting strip, and the projecting embedding part is embedded into said lowest installation groove.

Preferred embodiments of a mould profile for fabricating the prefabricated thermal insulating composite panel or the prefabricated thermal insulating composite panel with a corner that has been described above Refer to FIGS. 6 and 7 below. FIGS. 6 and 7 illustrate a mould profile 50 for fabricating the prefabricated thermal insulating composite panel or the prefabricated thermal insulating composite panel with a corner that has been described above according to a preferred embodiment of the present invention. Said mould profile 50 comprises a profile body 501 (preferably hollow and preferably formed by an aluminum alloy profile). The profile body comprises internal abutting parts 507 for the two frame connection parts 11 of the frame 2 of said prefabricated thermal insulating composite panel or said prefabricated thermal insulating composite panel with a corner to abut against during fabrication of said prefabricated thermal insulating composite panel or said prefabricated thermal insulating composite panel with a corner. A limiting projecting part 504 projects out from the surface of said internal abutting part 507 for being inserted into the installation groove 13 during fabrication of said prefabricated thermal insulating composite panel or said prefabricated thermal insulating composite panel with a corner so as to limit the core 9. The thickness of said limiting projecting part (i.e. the vertical dimension in FIG. 6) is equal to the width $W_{groove}$ of said installation groove. A top alignment projecting part 503 and a bottom alignment projecting part 52 are disposed on said internal abutting part 507 for determining the thickness of the reinforcing protective layer 7 during fabrication of said prefabricated thermal insulating composite panel or said prefabricated thermal insulating composite panel with a corner. The top alignment projecting part projects to above the top surface of said profile body 501, and said bottom alignment projecting part 502 projects to below the bottom surface of said profile body. The distance from the top surface of said limiting projecting part 504 to the top surface of said top alignment projecting part 503 is greater than the thickness of said frame connection parts 11 (i.e. the vertical dimension in FIG. 6). The distance from the bottom surface of said limiting projecting part 504 to the bottom surface of said bottom alignment projecting part 502 is greater than the thickness of said frame connection parts 11. The distance of said top alignment projecting part 503 projecting upwardly from the top surface of said limiting projecting part 504 is equal to the distance of said bottom alignment projecting part 502 projecting downwardly from the bottom surface of said limiting projecting part 504.

Preferred embodiments that use various construction methods of the present invention will be described below.

Technologies that use the cold bend thin wall steel profile frame of the present invention to take the place of steel bar and use the prefabricated thermal insulating composite panel (with and/or without a corner) of the present invention to take the place of external concrete forms—Construction technologies in preferred embodiments of the concrete slab structural member of the present invention The construction method in a preferred embodiment relates to a cast-in-place concrete technology that uses the permanent concrete form including the prefabricated thermal insulating composite panel and/or prefabricated thermal insulating composite panel with a corner of the present invention to take the place of external concrete forms according to the prior art and to combine with a cold bend thin wall steel profile frame. It will be described below with reference to FIGS. 13-16 and 17-22. Those skilled in the art should understand that in said construction method, the assembly method shown in FIGS. 13-16 will substantially be applied in FIGS. 17-22.

The construction method for a cast-in-place concrete wall according to said preferred embodiment comprises the following steps: a step of installing a cold bend thin wall steel profile frame; a step of installing an external concrete form, wherein the external concrete form is installed to be fixedly connected with the cold bend thin wall steel profile frame, the permanent concrete form of the thermal insulating composite panel structure assembly that has been described above is used as the external concrete form, the tension connection member is inserted into the installation grooves 13 on the side edges of two adjacent prefabricated thermal insulating composite panels 1 or two adjacent prefabricated thermal insulating composite panels with a corner 20 or adjacent prefabricated thermal insulating composite panel 1 and prefabricated thermal insulating composite panel with a corner 20 (in said preferred embodiment, the tension connection member 165 is inserted into horizontal installation grooves 13. In practice, however, the tension connection members 165, 16, 17 may be inserted into vertical installation grooves 13, or the tension connection members 16, 17, 165 may be inserted into both horizontal installation grooves 13 and vertical installation grooves 13 according to project needs. Alternatively, the seamed embedding strips 166, 169 and/or the seamless embedding strips 177, 178 may be inserted into vertical and horizontal installation grooves), and the fixed connection between the external concrete form and the cold bend thin wall steel profile frame is achieved through the fixed connection between the projecting part of the tension connection member 16, 17, 165 and the cold bend thin wall steel profile frame; a step of installing an internal concrete form 92, wherein the internal concrete form is installed to be fixedly connected with the cold bend thin wall steel profile frame.

In the construction method for a cast-in-place concrete wall according to said preferred embodiment, the surface size of the main surface of the prefabricated thermal insulating composite panel 1 or the prefabricated thermal insulating composite panel with a corner 20 included in said external concrete form is a modular size, and the step of installing the external concrete form is repeated so as to reach a floor height by assembling multiple layers of the external concrete form with a modular size.

In the construction method for a cast-in-place concrete wall according to said preferred embodiment, the surface size of the main surface of said internal concrete form 92 is the same as the surface size of the main surface of said external concrete form, as shown in FIG. 18, the step of installing the internal concrete form 92 is repeated so as to reach a floor height by assembling multiple layers of the internal concrete form with a modular size, and the assembly of the external concrete form with a modular size and the assembly of the internal concrete form 92 with a modular size opposing the external concrete form are carried out alternately.

In the construction method for a cast-in-place concrete wall according to said preferred embodiment, when installing the external concrete form and internal concrete form at the very bottom layer, it comprises a step of installing a starting strip 31 on the starting platform 30, wherein the starting strip 31 is fixed on the starting platform 30, the starting strip has a projecting embedding part 310, the lowest installation groove 13 on the lowest prefabricated thermal insulating composite panel 1 or prefabricated thermal insulating composite panel with a corner 20 included in said permanent concrete form cooperates with the projecting embedding part 310 of said starting strip, such that the projecting embedding part 310 is embedded into said lowest installation groove 13, thereby fixing and positioning the lowest prefabricated thermal insulating composite panel or prefabricated thermal insulating composite panel with a corner.

In the construction method for a cast-in-place concrete wall according to said preferred embodiment, the permanent concrete form proposed in the present invention is used as the external concrete form, and moreover, the cold bend thin wall steel profile frame structure proposed in the present invention is used as the reinforcing bar and as the concrete form support. The step of installing a cold bend thin wall steel profile frame comprises: installing a plurality of longitudinal steel profile keels 95, 85 that are spaced apart along the extension direction of the main surface of the concrete wall (refer to FIG. 17, the direction perpendicular to the paper in FIG. 17) and placed in parallel to one another, each of the longitudinal steel profile keels comprises two longitudinal cold bend thin wall steel profiles 951, 952; 851, 852, the main surfaces of said longitudinal cold bend thin wall steel profiles 951, 952 are set to be parallel to the main surface of said concrete wall and the internal main surface and the external main surface of the prefabricated thermal insulating composite panel 1 or the prefabricated thermal insulating composite panel with a corner 20 included in said thermal insulating composite panel structure assembly, such that said two longitudinal cold bend thin wall steel profiles are spaced apart and opposite each other along a direction perpendicular to the main surface of said concrete wall, and consequently a space 200 is left between the two longitudinal cold bend thin wall steel profiles, so that the concrete can easily flow through the space left between the two longitudinal cold bend thin wall steel profiles when it is poured.

In the construction method for a cast-in-place concrete wall according to said preferred embodiment, in the steps of installing the external concrete form and internal concrete form, it comprises: inserting the vertical embedding strip 177, 178 (not shown in FIG. 17, which can be understood with reference to FIGS. 13 and 16) and the tension connection member 16, 17, 165 (not shown in FIG. 17, which can be understood with reference to FIGS. 13 and 16) into the vertical installation grooves 13 on the side edges of laterally adjacent prefabricated thermal insulating composite panels 1, and inserting the lateral embedding strip 166, 169 (not shown in FIG. 17, which can be understood with reference to FIGS. 13 and 14) and the tension connection member 16, 17, 165 (not completely shown in FIG. 17, which can be understood with reference to FIGS. 13 and 14) into the horizontal installation grooves 13 between vertically adjacent prefabricated thermal insulating composite panels 1 and vertically adjacent prefabricated thermal insulating composite panels 20, wherein the fixed connection between the external concrete form and the cold bend thin wall steel profile frame is achieved by running the projecting part of the tension connection member 16, 17, 165 through the keel through holes 953, 954 on the longitudinal steel profile keel 95 included in the steel profile frame to connect with the tension sleeve 90 disposed at the internal side of the vertical keel through threads so as to fixedly connect the prefabricated thermal insulating composite panel or the prefabricated thermal insulating composite panel with a corner with the cold bend thin wall steel profile frame, and running a tension bolt 91 having a gasket from the internal side of the internal concrete form 92 through the keel through holes between the adjacent internal concrete forms to connect with the tension sleeve 90 through threads so as to fixedly connect all internal concrete forms with the cold bend thin wall steel profile frame. Threads on the projecting parts are not drawn on the tension connection member 16, 17 shown in the figures. However, it should be understood that external threads may be formed as needed. If thread connection is not used, connection holes or other connection structures may be employed. In FIGS. 13 and 16, the seam formed by horizontal installation C is seamed seam, and the seamed tension connection member 16 and seamed embedding strips 166, 169 are placed into the horizontal installation grooves, while the seam formed by vertical installation C is seamless seam, and the seamless tension connection member 17 and seamless embedding strips 177, 178 are placed into the vertical installation grooves. However, it should be understood that it is also possible that the vertical seam is seamless seam, while the horizontal seam is seamed seam, or both the vertical seam and the horizontal seam are seamless seams or seamed seams.

In the construction method for a cast-in-place concrete wall according to said preferred embodiment, when assembling the permanent external concrete form with the internal concrete form 92 to fixedly connect the same with the cold bend thin wall steel profile frame, the limiting sleeve 80, the tension connection member 16, 17, 165 and the tension bolt 91 are used to form a reliable cavity with equal width.

As shown in FIG. 17, moreover, those skilled in the art should understand that the cold bend thin wall steel profile frame of the present invention can also be used for pouring floor slabs. It is just that the permanent concrete form of the present invention does not need to be used when pouring floor slabs. Instead, regular detachable concrete forms are fixedly connected to below the cold bend thin wall steel profile frame, and then concrete can be poured from above. When the roof slab of a building needs to be constructed, the permanent concrete form of the present invention can be fixedly connected to below the cold bend thin wall steel profile frame, and then concrete can be poured from above. After pouring, the permanent concrete form forms a thermal insulating layer to enhance the building's thermal insulating capability.

With respect to the above specific embodiments that use the cold bend thin wall steel profile frame of the present invention to take the place of steel bar and use the composite panel of the present invention (permanent concrete form) to take the place of external concrete forms, those skilled in the art may employ specific flows according to practical needs of a project to make various changes and adjustments. A flow that can be used in specific project practices according to the present application is as follows:

1. Design the structure layout diagram of the cold bend thin wall steel profile frame with a computer aided design program or through manual design, which accurately labels the position of each thin wall steel profile parts;

2. Design the layout diagram of the composite panels with a computer aided design program or through manual design, which accurately labels the positions of standard composite panels and non-standard composite panels;

3. When the foundation construction is completed, begin the construction of a starting platform. It is required that the sizes be accurate and the entire circumference be at the same elevation. Begin to continuously fix starting strips and starting keels according to the design requirements;

4. Perform the construction of vertical keels, fit the vertical keels into the starting keels and complete bolt connection, and then connect the lateral steel profile keels onto the vertical keels via bolts such that it becomes a stable structure;

5. Fix and install the internal concrete forms to be highly consistent with the composite panels of the present invention, install the external concrete forms, and insert starting strips or lateral embedding strips into the installation grooves at the bottom end of the composite panels of the present invention;

6. Install the composite panels of the present invention layer by layer, insert vertical embedding strips into side edges between the panels, place lateral embedding strips into the top end, and the modular internal concrete forms and the external concrete forms form a reliable cavity with equal width through the limiting members (sleeves), tension connection members, tension members (sleeves) and internal tension bolts;

7. Repeat Steps 5 and 6 to the position of floor slabs, the modular internal concrete forms intersect with the bottom concrete forms of the floor slab (optionally the thermal insulating composite panels of the present invention or detachable modular concrete forms may be used), and construct a reliable support, continue upwardly to install one to two pieces of the composite panel of the present invention and connect with the raised vertical keels;

8. Conduct the construction of the cold bend thin wall steel profile frame and concrete forms (including the composite panels of the present invention and internal concrete forms) alternately. Typically, the vertical keels are 90 cm above the floor surface and function as a temporary fence. When the installation of floor thin wall steel profiles is completed, pour concrete for the lower level walls and the floor. Make sure to pour in rounds with each pouring at about 0.5 m high;

9. Repeat Steps 5~8 to the roof.

Cast-in-place concrete technologies that use the composite panel of the present invention as permanent concrete form to take the place of external concrete forms—Construction technologies in preferred embodiments of the concrete wall slab structural member of the present invention The construction method in another preferred embodiment relates to a cast-in-place concrete technology that uses the permanent concrete form of the present invention to take the place of regular detachable external concrete forms, and said technology does not need to use the cold bend thin wall steel profile frame of the present invention, but use the regular steel bar of the prior art as the reinforcing bar.

It will be described below with reference to FIGS. 13-16 and 23-24. Those skilled in the art should understand that in said construction method, the assembly method shown in FIGS. 13-16 will substantially be applied in FIGS. 23-24.

The construction method for a cast-in-place concrete wall according to said preferred embodiment comprises the following steps: installing a concrete form support structure; a step of installing an internal concrete form 92, wherein the internal concrete form 92 is fixedly connected with said concrete form support structure; a step of installing an external concrete form, wherein the permanent concrete form of the thermal insulating composite panel structure assembly of the present invention that has been described above is used as the external concrete form, the tension connection member 16, 17, 165 is inserted into the installation grooves 13 on the side edges of two adjacent prefabricated thermal insulating composite panels 1 or two adjacent prefabricated thermal insulating composite panels with a corner 20 or adjacent prefabricated thermal insulating composite panel 1 and prefabricated thermal insulating composite panel with a corner 20 to connect the projecting part of the tension connection member 16, 17, 165 to said concrete form support structure, thereby fixedly connecting the external concrete form with the concrete form support structure.

In the construction method for a cast-in-place concrete wall according to said preferred embodiment, when installing the external concrete form at the very bottom layer, it comprises a step of installing a starting strip 31 on the starting platform 30, wherein the starting strip 31 is fixed on the starting platform 30, the starting strip has a projecting embedding part 310, the lowest installation groove 13 on the lowest prefabricated thermal insulating composite panel or prefabricated thermal insulating composite panel with a corner included in said permanent concrete form cooperates with the projecting embedding part 310 of said starting strip, such that the projecting embedding part is embedded into said lowest installation groove 13, thereby positioning the lowest composite panel.

In the construction method for a cast-in-place concrete wall according to said preferred embodiment, in the step of installing an internal concrete form 92, the fixed connection between the internal concrete form 92 and said concrete form support structure is achieved by running a tension bolt 91 through the concrete form support structure from the external side to be fixedly connected with the tension sleeve 90 disposed at the internal side of the concrete form support structure, and in the step of installing an external concrete form, the end of the projecting part of the tension connection member 165 is connected with the tension sleeve 90.

In the construction method for a cast-in-place concrete wall according to said preferred embodiment, there is threaded connection between said tension connection member 165 and said tension sleeve 90, there is threaded connection between said tension bolt 91 and said tension sleeve 90, the connection point between said tension connection member 165 and said tension sleeve 90 is at the external portion of said tension sleeve 90, and the connection point between said tension bolt 91 and said tension sleeve 90 is at the external portion of said tension sleeve 90.

With respect to the above specific embodiments that the composite panel of the present invention as the permanent concrete form to take the place of detachable external concrete forms, according to the above disclosure of the construction method in said preferred embodiment, those skilled in the art may employ specific flows according to practical needs of a project to make various changes and adjustments. A flow that can be used in specific project practices according to the present application is as follows:

1. Design the structure layout diagram of the composite panel (flat composite panel and/or composite panel with a corner) with a computer aided design program or through manual design, which accurately labels the positions of standard composite panels and non-standard composite panels;

2. When the foundation construction is completed, begin the construction of a starting platform of the first layer of composite panels. It is required that the sizes be accurate and the entire circumference be at the same elevation. Begin to continuously fix starting strips;

3. Fix and install the internal concrete forms to be highly consistent with the composite panels, install the composite panels, and clamp the installation grooves at the bottom end onto the projecting embedding parts of the starting strips or lateral embedding strips;

4. Install the composite panels layer by layer, insert vertical embedding strips into side edges between the panels, place lateral embedding strips into the top end, and the internal concrete forms and the external composite panels form a reliable cavity with equal width through the tension connection members, limiting sleeves, and internal tension bolts;

5. The internal concrete forms form a stable temporary structure with the concrete form vertical keel, the concrete form lateral keel and the side support through the internal tension bolts, which is consistent with conventional concrete form construction, so as to ensure the wall perpendicularity;

6. Repeat Steps 4 and 5 to the position of floor slabs, the internal concrete forms intersect with the bottom concrete forms of the floor slab (optionally the composite panels or regular concrete forms may be used), and construct a reliable support, continue upwardly to install one piece of the external composite panel and construct a temporary support;

7. Conduct the steel bar assembly and the construction of the concrete forms alternately. Typically, the construction of steel bar and concrete forms stops at the floor, and when the floor steel bar assembly is completed, pour concrete. Make sure to pour in rounds with each pouring at about 0.5 m high;

8. Repeat Steps 3~7 to the roof.

Construction technologies based on an existing substrate wall—Construction technologies in preferred embodiments of the wall structural member of the present invention The construction method in another preferred embodiment relates to a technology that adds the composite panels of the present invention to an existing substrate wall so as to perform decorative renovation, thermal insulation renovation or other renovation thereon. In said technology, the permanent concrete form of the present invention that includes the thermal insulating composite panel structure assembly or the prefabricated thermal insulating composite panel and/or the prefabricated thermal insulating composite panel with a corner that have been described above is used as the external thermal insulating layer and/or decorative layer. When the permanent concrete form has been installed, a desired filling material can be filled between the permanent concrete form and the existing substrate wall. For example, the filling of a thermal insulating material can further provide a thermal insulating capability to the wall. The filling of concrete can further provide strength and endurance to the wall. The filling of fine aggregate concrete can provide water-proof capability to the wall. Alternatively, space does not have to be left between the permanent concrete form and the existing several layers of wall. Instead, the permanent concrete form is installed and fixed immediately next to the existing substrate wall or only a very small space is left due to construction needs. As a result, no filling materials need to be filled between the permanent concrete form and the existing substrate wall.

It will be described below with reference to FIGS. 13-16 and 25. Those skilled in the art should understand that in said construction method, the assembly method shown in FIGS. 13-16 will substantially be applied in FIG. 25.

The construction method for a concrete wall according to another preferred embodiment comprises the following steps: a step of installing a thermal insulating layer part at the external side of the existing wall main structure part 100, wherein said thermal insulating layer part is fixedly connected with said wall main structure part 100, wherein said thermal insulating layer part includes the thermal insulating composite panel structure assembly as set forth in any claim of claims 19-23. In the step of installing a thermal insulating layer part, the projecting part of the tension connection member 16, 165 included in said thermal insulating composite panel structure assembly is fixedly connected with said wall main structure part 100 so as to fixedly connect said thermal insulating composite panel structure assembly to said wall main structure part.

In the construction method for a concrete wall according to said another preferred embodiment, said tension connection member 16 is a tension connection member 16 having a fastening hole on the projecting part. In the step of installing a thermal insulating layer part, a support member 202 is first fixed to the external side of said wall main structure part, then said tension connection member 16 is fixedly connected to said support member 202 through the fastening hole on said projecting part of said tension connection member and a fastening member 203, thereby connecting the prefabricated thermal insulating composite panel 1 or the prefabricated thermal insulating composite panel with a corner 20 included in the thermal insulating composite panel structure assembly to the wall main structure part 100.

In the construction method for a concrete wall according to said another preferred embodiment, the step of installing a thermal insulating layer part further comprises: fixing a starting strip 31 on the starting platform 30 at the bottom, the starting strip 31 having a projecting embedding part 310 that projects upwardly, and making the lowest installation groove 13 on the lowest prefabricated thermal insulating composite panel and prefabricated thermal insulating composite panel with a corner included in said thermal insulating composite panel structure assembly to cooperate with the projecting embedding part 310 of said starting strip so as to embed the projecting embedding part into said lowest installation groove.

In the construction method for a concrete wall according to said another preferred embodiment, in the step of installing a thermal insulating layer part, a space is left for pouring concrete between said thermal insulating layer part and said wall main structure part 100. When the thermal insulating layer part has been installed, a dense fine aggregate concrete is poured into said space so as to improve the structural strength and water proof capability of the existing wall substrate.

In the construction method for a concrete wall according to said another preferred embodiment, when the support member 202 is fixed to the wall main structure part 100, an expansion bolt 201 is used to fix the support member laterally or vertically to the wall main structure part 100.

With respect to the above specific embodiments that apply the composite panel of the present invention onto a foundation of the existing substrate wall, according to the above disclosure of the construction method in said preferred embodiment, those skilled in the art may employ specific flows according to practical needs of a project to make various changes and adjustments. A flow that can be used in specific project practices according to the present application is as follows:

1. Measure and draw a plot of the existing substrate wall, including door and window openings, corners, etc.;
2. Arrange standard and non-standard composite panels on the wall plot with a computer aided design program or through manual design as the design layout diagram, accurately label the positions of standard composite panels and non-standard composite panels, and arrange for separate design and fabrication of products with non-standard sizes;
3. Position and draw lines on the substrate wall according to the design layout diagram;
4. Build a starting platform of the first layer of composite panels. It is required that the sizes be accurate and the entire circumference be at the same elevation. Begin to continuously fix starting strips;
5. Fix separate or continuous angle irons with expansion bolts onto the substrate wall according to the positioning lines and points in either lateral or vertical arrangements;
6. Install the composite panels from the first layer and layer by layer, clamp the installation grooves at the bottom end onto the projecting embedding parts of the starting strips or lateral embedding strips, insert vertical embedding strips into side edges between the panels, connect the top end with the angle iron through the tension connection member, and place lateral embedding strips into the top end;
7. Repeat Step 6 to the roof;
8. When two layers of the composite panels have been installed, pour a self-compaction fine aggregate concrete to improve the structural strength and water-proof capability of the existing wall.

A prefabrication method for fabricating the prefabricated thermal insulating composite panel or the prefabricated thermal insulating composite panel with a corner The present invention further proposes a fabrication process for the prefabricated thermal insulating composite panel or the prefabricated thermal insulating composite panel with a corner that has been described above. It will be described below with reference to FIGS. 1-8, in particular FIGS. 6-7.

As shown in FIGS. 6-7, the fabrication process for the prefabricated thermal insulating composite panel or the prefabricated thermal insulating composite panel with a corner according to a preferred embodiment relates to a prefabrication method for fabricating the prefabricated thermal insulating composite panel or the prefabricated thermal insulating composite panel with a corner of the present invention. In said prefabrication method, the mould profile 50 of the present invention that has been described above is used, comprising the following steps:

(1) Using the frame assembled by the aluminum alloy mould profile 50 as the mould;

(2) Placing the core 9 having the frame 2 into the mould such that the installation groove 13 of the frame 2 closely combines with the limiting projecting part 504 at the internal side of said mould profile 50 to limit the core 9;

(3) Applying a reinforcing protective layer 7 formed by cement-based or gypsum-based polymer-modified mortar on one side of the core 9, when coating the reinforcing protective layer 7 formed by cement-based or gypsum-based polymer-modified mortar, using high points of the alignment projecting parts 503, 502 on the cross section of said mould profile 50 as the control points for the thickness of the reinforcing protective layer 7 of the composite panel so as to ensure the uniform thickness and size of the composite panel;

(4) Turning over the mould, and repeating Step 3 for applying a reinforcing protective layer 7 formed by cement-based or gypsum-based polymer-modified mortar on the other side of the core 9;

(5) Detaching the form remove said mould profile 50;

(6) Maintaining the thermal insulating composite panel or the prefabricated thermal insulating composite panel with a corner.

In the prefabrication method according to said preferred embodiment, when applying a reinforcing protective layer 7 formed by cement-based or gypsum-based polymer-modified mortar on every side the core 9, said reinforcing protective layer 7 is applied in two equal layers 71, wherein the first layer of the reinforcing protective layer 71 formed by cement-based or gypsum-based polymer-modified mortar is first applied on the core 9, coating a reinforcing material 8, and then the second layer of the reinforcing protective layer 71 formed by cement-based or gypsum-based polymer-modified mortar is further coated. When the second layer of the reinforcing protective layer 71 formed by cement-based or gypsum-based polymer-modified mortar is coated, use high points of the alignment projecting parts 503, 502 on the cross section of said mould profile 50 as the control points for the thickness of the reinforcing protective layer 7 of the composite panel.

In the prefabrication method according to said preferred embodiment, after applying a reinforcing protective layer 7 formed by cement-based or gypsum-based polymer-modified mortar on one side of the core 9 or after applying a reinforcing protective layer 7 formed by cement-based or gypsum-based polymer-modified mortar on the other side of the core 9, and before the mould detaching step, apply a decorative surface layer 15 on the reinforcing protective layer 7 of said side or said other side, such that it binds with the reinforcing protective layer 7.

When the composite panel fabricated using the prefabrication method according to said preferred embodiment has been maintained, the reinforcing protective layer 7 of the composite panel hardens and binds with the core 9 to become a whole piece, which is inspected and packaged at the factory, and then can be delivered.

In said preferred embodiment, the mould assembled by the mould profiles is placed on a substrate 508 for operations during the prefabrication. Those skilled in the art should understand that the mould may also be placed on other types of operational platforms during the prefabrication.

In the present application documents, all "including . . . " mean both "including . . . " and "consisting of . . . ".

The mould profiles of the present application for fabricating composite panels may be used to fabricate various prefabricated thermal insulating composite panels or prefabricated thermal insulating composite panels with a corner that the present invention requests to protect, and to fabricate composite panels in other forms that comprise a core, reinforcing protective layers on both sides of the core to cover the core and installation grooves on side end surfaces.

The method of the present application that uses mould profiles to fabricate composite panels may be used to fabricate various prefabricated thermal insulating composite panels or prefabricated thermal insulating composite panels with a corner that the present invention requests to protect, and to fabricate composite panels in other forms that comprise a core, reinforcing protective layers on both sides of the core to cover the core and installation grooves on side end surfaces.

The description of various structural members and methods in the Description of the present application focuses on the description of aspects related to the present invention. According to actual requirements of engineering design and construction, those skilled in the art may supplement, amend or add or delete the steps included in all methods disclosed in the Description. Without departing from the principle of the present invention, these supplemented, amended or added or deleted methods will not depart from the scope of the present invention.

LIST OF PARTS AND FIGURE LEGENDS

Prefabricated thermal insulating composite panel 1
Core 9
Frame 2
Core fixing groove 3
Frame connection hole 4
Frame profile reinforcing member 5
Insert connection part 51
Corner frame profile reinforcing member 6
Corner insert connection part 61
Reinforcing protective layer 7
Internal main surface 101
External main surface 102
Side end surfaces 103, 104, 105, 106
Frame connection parts 11
Installation groove 13
Reinforcing net 8
Fixing wings 10
Insert connection part 51
Decorative surface layer 15
Inclined planes 108, 109
Prefabricated thermal insulating composite panel with a corner 20
Mould profile 50
Mould profile body 501
Bottom alignment projecting part 502
Top alignment projecting part 503
Limiting projecting part 504
Internal abutting parts 507
Substrate 508
Seamed tension connection member 16
Installation groove embedding parts 162, 163

Body 161
Projecting part 164
Seamed embedding strips 166, 169
Seamless tension connection member 17
Installation groove embedding parts 171, 172
Projecting part 173
Necking part 178
Seamless embedding strips 177, 178
Slot 179
Starting platform 30
Starting strip 31
Projecting embedding part 310
Expansion bolt 32, 201
Limiting sleeve 80
Tension sleeve 90
Tension bolt 91
Tension connection member 165
Starting platform 93
Concrete form 92
Starting keel 94
Longitudinal steel profile keel 95, 85
Keel through hole 953, 954
Longitudinal cold bend thin wall steel profile 951, 952, 851, 852
Steel profile connection member 96, 87
Steel profile connection member through hole 961
Longitudinal connection keel 97
Longitudinal connection steel profile 971, 972
Lateral connect profile keel 98
Lateral cold bend thin wall steel profile 981, 982, 881, 882
Diagonal connection steel profile keel 89
Diagonal cold bend thin wall steel profiles 891, 892
Self-tapping screw 81, 93, 203
Space 200
Concrete form lateral keel 921
Concrete form vertical keel 922
Tension bolt gasket 911
Wall main structure part 100
Support member 202

What is claimed is:

1. A prefabricated thermal insulating composite panel, which comprises an internal main surface, an external main surface, and four side end surfaces, includes a core made of the thermal insulation panel, characterized in that it further comprises:

two reinforcing protective layers formed by cement-based or gypsum-based polymer-modified mortar; said core is disposed between said two reinforcing protective layers, and said two reinforcing protective layers are bonded with said core;

a frame, said frame surrounds the periphery of the core and is fastened to the core, inside the internal main surface and the external main surface of said prefabricated thermal insulating composite panel, said reinforcing protective layers cover said frame such that said frame is exposed only at the four side end surfaces of said prefabricated thermal insulating composite panel, said frame comprises a first frame profile segment having two frame connection parts at the external side of said frame and disposed at the top and bottom of the frame, respectively, an installation groove at the external side of said frame and disposed between said two frame connection parts, said installation groove extends along the entire frame length;

a second frame profile segment adjacent and at a right angle to the first frame profile segment; and one or more frame reinforcing members engaging the first frame profile segment and the second frame profile segment to connect the first frame profile segment to a second frame profile segment.

2. The prefabricated thermal insulating composite panel as set forth in claim 1, characterized in that each reinforcing protective layer comprises a reinforcing material embedded therein, and the size of said prefabricated thermal insulating composite panel is a modular size that complies with the building standardization.

3. The prefabricated thermal insulating composite panel as set forth in claim 2, characterized in that said reinforcing material comprises a reinforcing net formed by alkali-resistant glass fiber, carbon fiber or steel fiber, or comprises alkali-resistant chopped glass fiber, chopped carbon fiber or chopped steel fiber that is evenly distributed in said reinforcing protective layers.

4. The prefabricated thermal insulating composite panel as set forth in claim 1, characterized in that said cement is Portland cement or magnesium oxychloride cement, and said thermal insulating panel is made of an organic or inorganic thermal insulating material.

5. The prefabricated thermal insulating composite panel as set forth in claim 1, characterized in that said thermal insulating panel is a thermal insulating panel made of an organic or inorganic thermal insulating material.

6. The prefabricated thermal insulating composite panel as set forth in claim 1, characterized in that said prefabricated thermal insulating panel is square or rectangular, and its size and weight are set to facilitate the manual transport and operation by construction workers.

7. A prefabricated thermal insulating composite panel, which comprises an internal main surface, an external main surface, and four side end surfaces, includes a core made of the thermal insulation panel, characterized in that it further comprises:

two reinforcing protective layers formed by cement-based or gypsum-based polymer-modified mortar; said core is disposed between said two reinforcing protective layers, and said two reinforcing protective layers are bonded with said core;

a frame, said frame surrounds the periphery of the core and is fastened to the core, inside the internal main surface and the external main surface of said prefabricated thermal insulating composite panel, said reinforcing protective layers cover said frame such that said frame is exposed only at the four side end surfaces of said prefabricated thermal insulating composite panel, said frame comprises two frame connection parts at the external side of said frame and disposed at the top and bottom of the frame, respectively, and an installation groove at the external side of said frame and disposed between said two frame connection parts, and said installation groove extends along the entire frame length;

said frame comprises four frame profile segments, both end surfaces of each frame profile segment are inclined planes such that each of the ends of the four frame profile segments can be assembled through butt joint to an end of another of the four frame profile segments to form a complete frame, each frame profile segment is formed integrally, and each frame profile segment comprises:

two fixing wings at the internal side of said frame profile and disposed at the top and bottom of the frame profile, respectively; and a core fixing groove at the internal side of said frame profile and disposed between said two fixing wings;

wherein, each of said two frame connection parts is formed with a frame connection hole, each of the edges of the four sides of said core of said prefabricated thermal insulating composite panel is inserted, respectively, into the core fixing groove of a frame profile segment between said two fixing wings of each frame profile segment;

said prefabricated thermal insulating composite panel further comprises:

a frame profile reinforcing member is disposed between every two frame profile segments with the ends thereof connected through butt joint, said frame profile reinforcing member comprises two insert connection parts, said two insert connection parts are inserted, respectively, into the adjacent frame connection holes of every two adjacent frame profile segments and fixed into the frame connection holes so as to connect the four frame profile segments to form a whole piece.

8. The prefabricated thermal insulating composite panel as set forth in claim 7, characterized in that said installation groove is disposed in the middle relative to said two frame connection parts, and said core fixing groove is disposed in the middle on the internal side of said frame relative to said two fixing wings.

9. The prefabricated thermal insulating composite panel as set forth in claim 8, characterized in that it further comprises a decorative surface layer, said decorative surface layer is disposed at the external side of the reinforcing protective layer at the external side of said prefabricated thermal insulating composite panel and is bonded with said reinforcing protective layer.

10. A prefabricated thermal insulating composite panel with a corner, characterized in that it comprises two thermal insulating composite panel parts, each of said two thermal insulating composite panel parts comprises an internal main surface, an external main surface, and four side end surfaces, one side end surface of said four side end surfaces is formed to be inclined planes that incline relative to the internal main surface and the external main surface of said thermal insulating composite panel part, the two inclined planes have the same size and same inclination angle for mutual cooperation, the two thermal insulating composite panel parts are connected at the inclined planes through butt joint such that the two thermal insulating composite panel parts are disposed in two different planes, respectively, said two different planes intersect each other, and each thermal insulating composite panel part comprises:

a core made of the thermal insulation panel;

two reinforcing protective layers formed by cement-based or gypsum-based polymer-modified mortar, said core is disposed between said two reinforcing protective layers, and said two reinforcing protective layers are bonded with said core;

a frame, said frame is disposed on three sides of the three side end surfaces other than the side end surface that is formed to have said inclined planes of said thermal insulating composite panel part of the core and is fastened to the core, inside each surface of the internal main surface and the external main surface of said prefabricated thermal insulating composite panel with a corner, said reinforcing protective layers cover said frame such that said frame is exposed only at said three side end surfaces of said prefabricated thermal insulating composite panel part of said prefabricated thermal insulating composite panel with a corner, said frame comprises two frame connection parts at the external side of said frame and disposed at the top and bottom of the frame, respectively, and an installation groove at the external side of said frame and disposed between said two frame connection parts, and said installation groove extends along the entire frame length.

11. The prefabricated thermal insulating composite panel with a corner as set forth in claim 10, characterized in that each reinforcing protective layer comprises a reinforcing material embedded therein, and the size of said prefabricated thermal insulating composite panel with a corner is a modular size that complies with the building standardization.

12. The prefabricated thermal insulating composite panel with a corner as set forth in claim 11, characterized in that said reinforcing material comprises a reinforcing net formed by alkali-resistant glass fiber, carbon fiber or steel fiber, or comprises alkali-resistant chopped glass fiber, carbon fiber or steel fiber that is evenly distributed in said reinforcing protective layers.

13. The prefabricated thermal insulating composite panel with a corner as set forth in claim 11, characterized in that said cement is Portland cement or magnesium oxychloride cement, and said thermal insulating panel is made of an organic or inorganic thermal insulating material.

14. The prefabricated thermal insulating composite panel with a corner as set forth in claim 10, characterized in that it further comprises a decorative surface layer, said decorative surface layer is disposed at the external side of the reinforcing protective layer at the external side of said prefabricated thermal insulating composite panel with a corner and is bonded with said reinforcing protective layer.

15. The prefabricated thermal insulating composite panel with a corner as set forth in claim 10, characterized in that said thermal insulating panel is a thermal insulating panel made of an organic or inorganic thermal insulating material.

16. The prefabricated thermal insulating composite panel with a corner as set forth in claim 15, characterized in that the thermal insulating composite panel parts of said prefabricated thermal insulating panel having a corner are square or rectangular, and their size and weight are set to facilitate the manual transport and operation by construction workers.

\* \* \* \* \*